(12) United States Patent
Nagasaka et al.

(10) Patent No.: US 10,635,976 B2
(45) Date of Patent: Apr. 28, 2020

(54) MACHINE LEARNING SYSTEM FOR ESTIMATING A TEMPERATURE OF AN EXHAUST PURIFICATION CATALYST

(71) Applicant: TOYOTA JIDOSHA KABUSHIKI KAISHA, Toyota-shi, Aichi-ken (JP)

(72) Inventors: Keisuke Nagasaka, Gotemba (JP); Hiroshi Oyagi, Gotemba (JP); Yusuke Takasu, Sunto-gun (JP); Tomohiro Kaneko, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 15/987,172

(22) Filed: May 23, 2018

(65) Prior Publication Data

US 2019/0311262 A1 Oct. 10, 2019

(30) Foreign Application Priority Data

Apr. 5, 2018 (JP) .................................. 2018-073122

(51) Int. Cl.
| | |
|---|---|
| *G06N 3/08* | (2006.01) |
| *G06N 3/04* | (2006.01) |
| *F01N 11/00* | (2006.01) |
| *G06N 3/02* | (2006.01) |

(52) U.S. Cl.
CPC ............. *G06N 3/08* (2013.01); *F01N 11/005* (2013.01); *G06N 3/04* (2013.01); *F01N 2900/0402* (2013.01); *F01N 2900/08* (2013.01); *F01N 2900/1402* (2013.01); *F01N 2900/1602* (2013.01); *G06N 3/02* (2013.01)

(58) Field of Classification Search
CPC ... G06N 3/02; G06N 3/04; G06N 3/08; F01N 11/005; F01N 2900/0402; F01N 2900/08; F01N 2900/1402; F01N 2900/1602; F01N 2900/1404; F01N 2560/06; F01N 2560/022; F01N 2560/023; F01N 9/00; F01N 3/10
USPC ......................................... 706/16, 17, 25, 41
See application file for complete search history.

(56) References Cited

U.S. PATENT DOCUMENTS

| | | | |
|---|---|---|---|
| 2003/0217021 A1* | 11/2003 | Jacobson | ............ F02D 41/1405 706/16 |
| 2012/0014838 A1* | 1/2012 | Yasui | .................. F02D 41/0062 422/105 |
| 2018/0297578 A1* | 10/2018 | Park | ....................... B60W 20/11 |

FOREIGN PATENT DOCUMENTS

| | | |
|---|---|---|
| JP | 2004-346877 A | 12/2004 |
| JP | 2007-309244 A | 11/2007 |
| JP | 2007-315340 A | 12/2007 |

(Continued)

*Primary Examiner* — Shane D Woolwine
(74) *Attorney, Agent, or Firm* — Oliff PLC

(57) ABSTRACT

A learning use data set showing relationships among an engine speed, an engine load rate, an air-fuel ratio of the engine, an ignition timing of the engine, an HC or CO concentration of exhaust gas flowing into an exhaust purification catalyst and a temperature of the exhaust purification catalyst is acquired. The acquired engine speed, engine load rate, air-fuel ratio of the engine, ignition timing of the engine, and HC or CO concentration of the exhaust gas flowing into the exhaust purification catalyst are used as input parameters of a neural network and the acquired temperature of the exhaust purification catalyst is used as training data to learn a weight of the neural network. The learned neural network is used to estimate the temperature of the exhaust purification catalyst.

1 Claim, 15 Drawing Sheets

(56) References Cited

FOREIGN PATENT DOCUMENTS

| | | |
|---|---|---|
| JP | 2012-026302 A | 2/2012 |
| JP | 2016-166540 A | 9/2016 |
| WO | 2010/109667 A1 | 9/2010 |

* cited by examiner

FIG. 8

| No. | $x_1$ | $x_2$ | $x_3$ | $x_4$ | $x_5$ | $y_t$ |
|---|---|---|---|---|---|---|
| 1 | $a_1$ | $b_1$ | $c_1$ | $d_1$ | $e_1$ | $f_1$ |
| 2 | $a_2$ | $b_2$ | $c_2$ | $d_2$ | $e_2$ | $f_2$ |
| ... | ... | ... | ... | ... | ... | ... |
| n | $a_n$ | $b_n$ | $c_n$ | $d_n$ | $e_n$ | $f_n$ |
| ... | ... | ... | ... | ... | ... | ... |
| N | $a_N$ | $b_N$ | $c_N$ | $d_N$ | $e_N$ | $f_N$ |

FIG. 13A

| No. | $x_1$ | $x_2$ | $x_3$ | $y_t'$ |
|---|---|---|---|---|
| 1 | $a_1$ | $b_1$ | $c_1$ | $y_1'$ |
| 2 | $a_2$ | $b_2$ | $c_2$ | $y_2'$ |
| ⋮ | ⋮ | ⋮ | ⋮ | ⋮ |
| n | $a_n$ | $b_n$ | $c_n$ | $y_n'$ |
| ⋮ | ⋮ | ⋮ | ⋮ | ⋮ |
| N | $a_N$ | $b_N$ | $c_N$ | $y_N'$ |

FIG. 13B

| No. | $x_1$ | $x_2$ | $x_3$ | $x_4$ | $x_5$ | $y_t$ |
|---|---|---|---|---|---|---|
| 1 | $a_1$ | $b_1$ | $c_1$ | $d_1$ | $y_1'$ | $f_1$ |
| 2 | $a_2$ | $b_2$ | $c_2$ | $d_2$ | $y_2'$ | $f_2$ |
| ⋮ | ⋮ | ⋮ | ⋮ | ⋮ | ⋮ | ⋮ |
| n | $a_n$ | $b_n$ | $c_n$ | $d_n$ | $y_n'$ | $f_n$ |
| ⋮ | ⋮ | ⋮ | ⋮ | ⋮ | ⋮ | ⋮ |
| N | $a_N$ | $b_N$ | $c_N$ | $d_N$ | $y_N'$ | $f_N$ |

MACHINE LEARNING SYSTEM FOR ESTIMATING A TEMPERATURE OF AN EXHAUST PURIFICATION CATALYST

FIELD

The present invention relates to a machine learning device, a machine learning method, an electronic control unit and method of production of the same, a learned model, and a machine learning system.

BACKGROUND

In an internal combustion engine, usually if an engine starts to be decelerated in operation, the supply of fuel to the inside of the combustion chambers is stopped. When the engine speed next falls to a preset speed, the supply of fuel is restarted. In this case, if an exhaust purification catalyst is arranged inside the engine exhaust passage, when the supply of fuel is stopped, a large amount of oxygen will be supplied to the exhaust purification catalyst. If a large amount of oxygen is supplied to the exhaust purification catalyst in this way, the HC (hydrocarbons) or CO (carbon monoxide) which had been deposited on the exhaust purification catalyst before the supply of fuel was stopped will react with the oxygen. Due to the heat of oxidation reaction at that time, the temperature of the exhaust purification catalyst will rise. Further, at the time of restart of the supply of fuel, the oxygen which had been deposited on the exhaust purification catalyst while the supply of fuel was stopped will react with the HC or CO in the exhaust gas, and the temperature of the exhaust purification catalyst will also rise due to the heat of oxidation reaction at that time. Therefore, known in the art is a catalyst temperature estimating device designed to consider the heat of these oxidation reactions and estimate the temperature of the exhaust purification catalyst after restart of supply of fuel (for example, see Japanese Patent Publication No. 2007-309244A).

SUMMARY

Technical Problem

However, in actuality, the temperature of an exhaust purification catalyst greatly varies depending on the size of the engine, the number of cylinders of the engine, the position where the exhaust purification catalyst is set, etc. Further, it is known that the temperature of an exhaust purification catalyst is correlated with the value of the engine speed and various other operating parameters. However, what kind of operating parameters there is a strong correlation with in value has not been sufficiently studied. Further, even if there is correlation, the correlation is complicated, so what kind of correlation there is remains unclear. As a result, even if considering the heat of oxidation reactions in an exhaust purification catalyst like in the above-mentioned catalyst temperature estimating device, there is the problem that precise estimation of the exhaust purification catalyst temperature is difficult.

Therefore, the present invention tries to use a neural network to precisely predict the temperature of an exhaust purification catalyst of an internal combustion engine.

That is, according to a first aspect of the invention, there is provided a machine learning device using a neural network which predicts a temperature of an exhaust purification catalyst of an internal combustion engine, comprising:

a state acquiring unit for acquiring state variables comprised of an engine speed, an engine load rate, an air-fuel ratio of the engine, an ignition timing of the engine, an HC or CO concentration of exhaust gas flowing into an exhaust purification catalyst, and a temperature of the exhaust purification catalyst, and a learning unit for learning a temperature of the exhaust purification catalyst in accordance with a training data set comprised of the state variables.

According to a second aspect of the invention, there is provided a machine learning device using a neural network to predict a temperature of an exhaust purification catalyst of an internal combustion engine, comprising an electronic control unit, wherein the electronic control unit is configured to acquire a learning use data set showing relationships among an engine speed, an engine load rate, an air-fuel ratio of the engine, an ignition timing of the engine, an HC or CO concentration of exhaust gas flowing into an exhaust purification catalyst and a temperature of the exhaust purification catalyst, learn a weight of the neural network by using the acquired engine speed, engine load rate, air-fuel ratio of the engine, ignition timing of the engine, and HC or CO concentration of the exhaust gas flowing into the exhaust purification catalyst as input parameters of the neural network and using the acquired temperature of the exhaust purification catalyst as training data, and estimate the temperature of the exhaust purification catalyst by using the learned neural network.

According to a third aspect of the invention, there is provided a machine learning method using a neural network to predict a temperature of an exhaust purification catalyst of an internal combustion engine, comprising the steps of:

acquiring a learning use data set showing relationships among an engine speed, an engine load rate, an air-fuel ratio of the engine, an ignition timing of the engine, an HC or CO concentration of exhaust gas flowing into an exhaust purification catalyst and a temperature of the exhaust purification catalyst, learning a weight of the neural network by using the acquired engine speed, engine load rate, air-fuel ratio of the engine, ignition timing of the engine, and HC or CO concentration of the exhaust gas flowing into the exhaust purification catalyst as input parameters of the neural network and by using the acquired temperature of the exhaust purification catalyst as training data, and estimating the temperature of the exhaust purification catalyst by using the learned neural network.

According to a fourth aspect of the invention, there is provided a learned model for predicting a temperature of an exhaust purification catalyst of an internal combustion engine by using a neural network, which is generated by acquiring a learning use data set showing relationships among an engine speed, an engine load rate, an air-fuel ratio of the engine, an ignition timing of the engine, an HC or CO concentration of exhaust gas flowing into an exhaust purification catalyst and a temperature of the exhaust purification catalyst, and learning a weight of the neural network by using the acquired engine speed, engine load rate, air-fuel ratio of the engine, ignition timing of the engine, and HC or CO concentration of the exhaust gas flowing into the exhaust purification catalyst as input parameters of the neural network and by using the acquired temperature of the exhaust purification catalyst as training data.

According to a fifth aspect of the invention, there is provided an electronic control unit using a neural network to predict a temperature of an exhaust purification catalyst of an internal combustion engine, which electronic control unit has built into it a learned model which is generated by acquiring a learning use data set showing relationships among an engine speed, an engine load rate, an air-fuel ratio of the engine, an ignition timing of the engine, an HC or CO concentration of exhaust gas flowing into an exhaust purification catalyst and a temperature of the exhaust purification catalyst, and learning a weight of the neural network by using the acquired engine speed, engine load rate, air-fuel ratio of the engine, ignition timing of the engine, and HC or CO concentration of the exhaust gas flowing into the exhaust purification catalyst as input parameters of the neural network and by using the acquired temperature of the exhaust purification catalyst as training data.

According to a sixth aspect of the invention, there is provided a method of production of an electronic control unit for producing an electronic control unit using a neural network to predict a temperature of an exhaust purification catalyst of an internal combustion engine by incorporating a learned neural network inside it as a learned model, the learned neural network being generated by acquiring a learning use data set showing relationships among an engine speed, an engine load rate, an air-fuel ratio of the engine, an ignition timing of the engine, an HC or CO concentration of exhaust gas flowing into an exhaust purification catalyst and a temperature of the exhaust purification catalyst, and learning a weight of the neural network by using the acquired engine speed, engine load rate, air-fuel ratio of the engine, ignition timing of the engine, and HC or CO concentration of the exhaust gas flowing into the exhaust purification catalyst as input parameters of the neural network and by using the acquired temperature of the exhaust purification catalyst as training data.

According to a seventh aspect of the invention, there is provided a machine learning system for predicting a temperature of an exhaust purification catalyst of an internal combustion engine, the machine learning system comprising:

an engine speed acquiring unit for acquiring an engine speed,
an engine load rate acquiring unit for acquiring an engine load rate,
an air-fuel ratio acquiring unit for acquiring an air-fuel ratio of the engine,
an ignition timing acquiring unit for acquiring an ignition timing of the engine,
a concentration acquiring unit for acquiring an HC or CO concentration of exhaust gas flowing into the exhaust purification catalyst,
an exhaust purification catalyst temperature acquiring unit for acquiring a temperature of the exhaust purification catalyst,
a data set preparing unit for preparing a data set using the acquired engine speed, engine load rate, air-fuel ratio of the engine, ignition timing of the engine, HC or CO concentration, and exhaust purification catalyst temperature, and
a learning unit for learning the temperature of the exhaust purification catalyst in accordance with the data set.

According to an eighth aspect of the invention, there is provided a vehicle-mounted electronic control unit, wherein data showing an engine speed, an engine load rate, an air-fuel ratio of an engine, an ignition timing of the engine, an HC or CO concentration of exhaust gas flowing into an exhaust purification catalyst and a temperature of the exhaust purification catalyst are acquired in a vehicle, the data is transmitted to a server, a learned model is generated in the server by using a received engine speed, engine load rate, air-fuel ratio of the engine, ignition timing of the engine, and HC or CO concentration of the exhaust gas flowing into the exhaust purification catalyst as input parameters of a neural network and using a received temperature of the exhaust purification catalyst as training data to learn a weight of the neural network, the generated learned model is transmitted to the vehicle, and the temperature of the exhaust purification catalyst of the internal combustion engine is predicted by using the learned model from the acquired engine speed, the engine load rate, air-fuel ratio of the engine, ignition timing of the engine, and HC or CO concentration of the exhaust gas flowing into the exhaust purification catalyst in the vehicle, the server comprising:

an engine speed acquiring unit for acquiring an engine speed,
an engine load rate acquiring unit for acquiring an engine load rate,
an air-fuel ratio acquiring unit for acquiring an air-fuel ratio of the engine,
an ignition timing acquiring unit for acquiring an ignition timing of the engine,
a concentration acquiring unit for acquiring an HC or CO concentration of exhaust gas flowing into the exhaust purification catalyst,
an exhaust purification catalyst temperature acquiring unit for acquiring a temperature of the exhaust purification catalyst,
a data set preparing unit for preparing a data set using the acquired engine speed, engine load rate, air-fuel ratio of the engine, ignition timing of the engine, HC or CO concentration, and exhaust purification catalyst temperature, and
a learning unit for learning the temperature of the exhaust purification catalyst in accordance with the data set.

According to a ninth aspect of the invention, there is provided a machine learning device for performing a machine learning by using training data to predict a temperature of an exhaust purification catalyst of an internal combustion engine, comprising:

a state acquiring unit for acquiring state variables comprised of an engine speed, an engine load rate, an air-fuel ratio of the engine, an ignition timing of the engine, an HC or CO concentration of exhaust gas flowing into an exhaust purification catalyst, and a temperature of the exhaust purification catalyst, and
a learning unit for learning a temperature of the exhaust purification catalyst in accordance with a training data set comprised of the state variables.

Advantageous Effects of Invention

According to the first to third aspects of the invention, the engine speed, the engine load rate, the air-fuel ratio of the engine, the ignition timing of the engine, and the HC or CO concentration of the exhaust gas flowing into the exhaust purification catalyst are specified as operating parameters having strong correlation with the temperature of the exhaust purification catalyst, and by using these specified operating parameters to learn the weight of the neural network, it becomes possible to precisely predict the temperature of the exhaust purification catalyst.

According to the fourth aspect of the invention, a learned model enabling precise prediction of the temperature of the exhaust purification catalyst is provided.

According to the fifth aspect of the invention, an electronic control unit enabling precise prediction of the temperature of the exhaust purification catalyst is provided.

According to the sixth aspect of the invention, a method of production of an electronic control unit for producing an electronic control unit enabling precise prediction of the temperature of the exhaust purification catalyst is provided.

According to the seventh aspect of the invention, a machine learning system enabling precise prediction of the temperature of the exhaust purification catalyst is provided.

According to the eighth aspect of the invention, a vehicle-mounted electronic control unit enabling precise prediction of the temperature of the exhaust purification catalyst is provided.

According to the ninth aspect of the invention, a machine learning device for performing a machine learning by using training data enabling precise prediction of the temperature of the exhaust purification catalyst is provided.

BRIEF DESCRIPTION OF DRAWINGS

FIG. 8 is a view showing a learning use data set.

FIG. 13A and FIG. 13B are views showing a learning use data set.

DESCRIPTION OF EMBODIMENTS

Overall Configuration of Internal Combustion Engine

Figure 1:
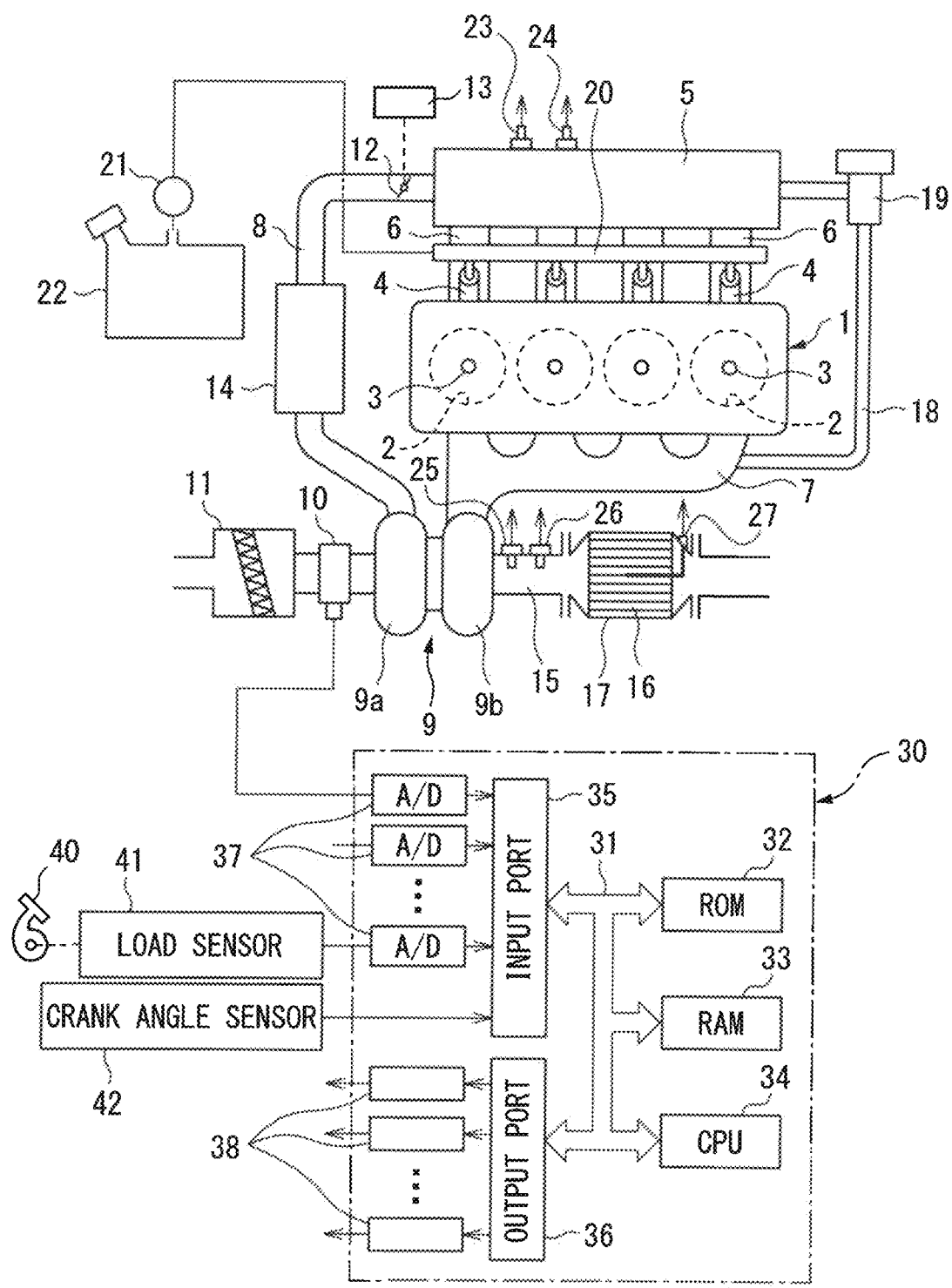
FIG. 1 is an overall view of an internal combustion engine.

FIG. 1 shows the overall configuration of an internal combustion engine. Referring to FIG. 1, 1 shows an engine body, 2 combustion chambers of the cylinders, 3 spark plugs arranged in the combustion chambers 2 of the cylinders, 4 fuel injectors for injecting fuel, for example, gasoline, to the cylinders, 5 a surge tank, 6 intake branch pipes, and 7 an exhaust manifold. The surge tank 5 is connected through an intake duct 8 to the outlet of a compressor 9a of an exhaust turbocharger 9, while the inlet of the compressor 9a is connected through an intake air amount detector 10 to an air cleaner 11. Inside the intake duct 8, a throttle valve 12 driven by an actuator 13 is arranged and, around the intake duct 8, an intercooler 14 is arranged for cooling the intake air flowing through the inside of the intake duct 8.

On the other hand, the exhaust manifold 7 is connected to the inlet of the exhaust turbine 9b of the exhaust turbocharger 9, while the outlet of the exhaust turbine 9b is connected through an exhaust pipe 15 to a catalytic converter 17 having an exhaust purification catalyst 16 therein. In an embodiment of the present invention, this exhaust purification catalyst 16 is comprised of a three way catalyst. The exhaust manifold 7 and the surge tank 5 are connected with each other through an exhaust gas recirculation (below, referred to as "EGR") passage 18. Inside the EGR passage 18, an EGR control valve 19 is arranged. Each fuel injector 4 is connected to a fuel distribution pipe 20. This fuel distribution pipe 20 is connected through a fuel pump 21 to a fuel tank 22. As shown in FIG. 1, a pressure sensor 23 and a temperature sensor 24 for detecting the pressure and the temperature in the surge tank 5, respectively, are arranged in the surge tank 5. In addition, an air-fuel ratio sensor 25 for detecting the air-fuel ratio of the exhaust gas and a HC concentration sensor 26 for detecting the HC concentration in the exhaust gas or a CO concentration sensor 26 for detecting the CO concentration in the exhaust gas are arranged in the exhaust pipe 15. Further, a temperature sensor 27 for detecting the temperature of the exhaust purification catalyst 16 is arranged in the exhaust purification catalyst 16.

An electronic control unit 30 is comprised of a digital computer provided with a ROM (read only memory) 32, RAM (random access memory) 33, CPU (microprocessor) 34, input port 35, and output port 36, which are connected with each other by a bidirectional bus 31. At the input port 35, output signals of the intake air amount detector 10, pressure sensor 23, temperature sensor 24, air-fuel ratio sensor 25, HC concentration sensor 26 or CO concentration sensor 26, and temperature sensor 27 are input through corresponding AD converters 37. At an accelerator pedal 40, a load sensor 41 generating an output voltage proportional to the amount of depression of the accelerator pedal 40 is connected. The output voltage of the load sensor 41 is input through the corresponding AD converter 37 to the input port 35. Furthermore, the input port 35 is connected to a crank angle sensor 42 generating an output pulse each time a crankshaft rotates by for example 30°. Inside the CPU 34, the engine speed is calculated based on the output signals of the crank angle sensor 42. On the other hand, the output port 36 is connected through corresponding drive circuits 38 to the spark plugs 3, the fuel injectors 4, the throttle valve drive use actuator 13, EGR control valve 19, and fuel pump 21.

Summary of Neural Network

Figure 2:
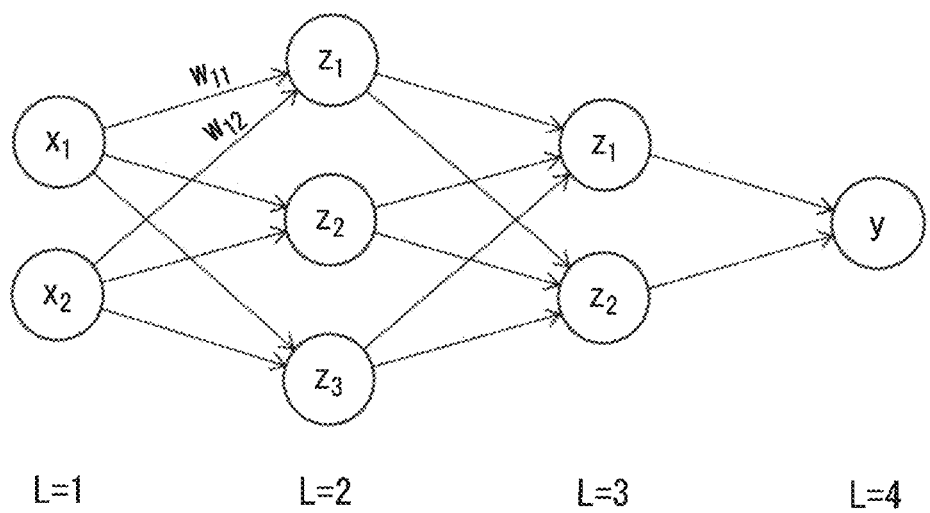
FIG. 2 is a view showing one example of a neural network.

In embodiments of the present invention, neural networks are used to estimate various values representing the performance of the internal combustion engine. FIG. 2 shows one example of a neural network. The circle marks in FIG. 2 show artificial neurons. In the neural network, these artificial neurons are usually called "node" or "unit" (in the present application, they are called "node"). In FIG. 2, L=1 shows an input layer, L=2 and L=3 show hidden layers, and L=4 shows an output layer. Further, in FIG. 2, $x_1$ and $x_2$ show output values from the nodes of the input layer (L=1), "y" shows the output value from the node of the output layer (L=4), $z_1$, $z_2$, and $z_3$ show output values from the nodes of one hidden layer (L=2), $z_1$ and $z_2$ show output values from the nodes of another hidden layer (L=3). Note that, the number of hidden layers may be made one or any other number, while the number of nodes of the input layer and number of nodes of the hidden layers may also be made any numbers. Note that, in the embodiments according to the present invention, the number of nodes of the output layer is made one node.

At the nodes of the input layer, the inputs are output as they are. On the other hand, at the nodes of one hidden layer (L=2), the output values $x_1$ and $x_2$ of the nodes of the input layer are input, while at the nodes of one hidden layer (L=2), the respectively corresponding weights "w" and biases "b" are used to calculate the sum input value "u". For example, a sum input value $u_k$ calculated at a node shown by $z_k$ (k=1, 2, 3) of one hidden layer (L=2) in FIG. 2 becomes as shown in the following formula:

$$U_k = \sum_{m=1}^{n} (x_m \cdot w_{km}) + b_k$$

Next, this sum input value $u_k$ is converted by an activating function "f" and is output from a node shown by $z_k$ of one hidden layer (L=2) as an output value $z_k$ (=f($u_k$)). The same is true for the other nodes of one hidden layer (L=2). On the other hand, the nodes of another hidden layer (L=3) receive as input the output values $z_1$ $z_2$, and $z_3$ of the nodes of one hidden layer (L=2). At the nodes of the other hidden layer (L=3), the respectively corresponding weights "w" and biases "b" are used to calculate the sum input value u(Σz·w+b). The sum input value "u" is similarly converted by an activating function and output from the nodes of the other hidden layer (L=3) as the output values $z_1$ and $z_2$. Note that, in embodiments according to the present invention, as this activating function, a Sigmoid function σ is used.

On the other hand, at the node of the output layer (L=4), the output values $z_1$ and $z_2$ of the nodes of the other hidden layer (L=3) are input. At the node of the output layer, the respectively corresponding weights "w" and biases "b" are used to calculate the sum input value u(Σz·w+b) or just the respectively corresponding weights "w" are used to calculate the sum input value u(Σz·w). In this embodiment according to the present invention, at the node of the output layer, an identity function is used, therefore, from the node of the output layer, the sum input value "u" calculated at the node of the output layer is output as it is as the output value "y".

Expression of Function by Neural Network

Figure 3A:
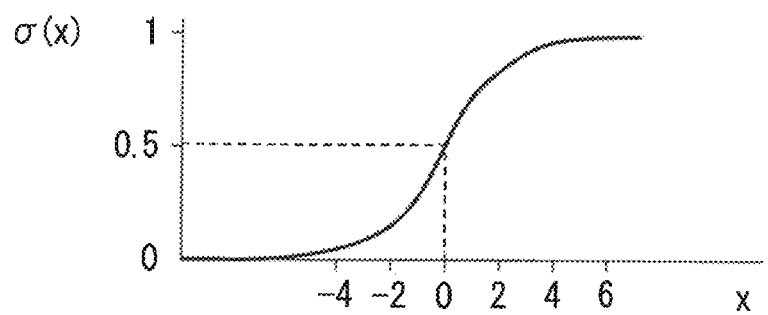
FIG. 3A and FIG. 3B are views showing changes in values of a Sigmoid function σ.
Figure 3B:
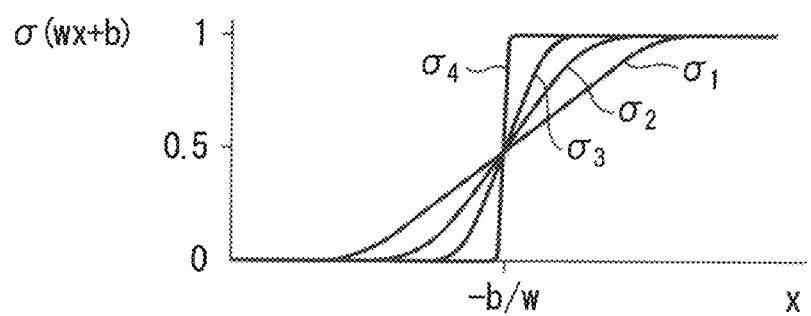

Now then, it is possible to express any function if using a neural network. Next, this will be simply explained. First, if explaining the Sigmoid function σ used as the activating function, the Sigmoid function σ is expressed as σ(x)=1/(1+exp(−x)) and takes a value between 0 and 1 corresponding to the value of "x" as shown in FIG. 3A. Here, if replacing "x" with "wx+b", the Sigmoid function σ is expressed as σ(wx+b)=1/(1+exp(−wx−b)). Here, if increasing the value of "w", as shown by the curves $\sigma_1$, $\sigma_2$, and $\sigma_3$ in FIG. 3B, the slant of the curved part of the Sigmoid function σ(wx+b) gradually becomes steeper. If making the value of "w" infinitely large, as shown by the curve $\sigma_4$ in FIG. 3B, the Sigmoid function σ(wx+b) changes in steps as shown in FIG. 3B at the "x" where x=−b/w(wx+b=0), that is, at the "x" where σ(wx+b)=0.5. If utilizing this property of the Sigmoid function σ, a neural network can be used to express any function.

Figure 4A:
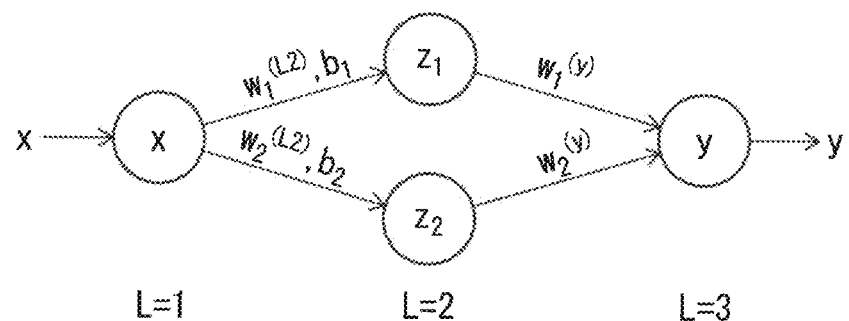
FIG. 4A and FIG. 4B respectively are views showing a neural network and output values from nodes of a hidden layer.

To explain this matter, first, a neural network such as shown in FIG. 4A comprising an input layer (L=1) comprised of a single node, a hidden layer (L=2) comprised of two nodes, and an output layer (L=3) comprised of a single node will be explained. In this neural network, as shown in FIG. 4A, the node of the input layer (L=1) receives as input the input value "x", while the node shown by $z_1$ at the hidden layer (L=2) receives as input the input value u=x·$w_1^{(L2)}$+$b_1$ calculated using a weight $w_1^{(L2)}$ and a bias $b_1$. This input value "u" is converted by the Sigmoid function σ(x·$w_1^{(L2)}$+$b_j$) and output as the output value $z_1$. Similarly, the node shown by $z_2$ at the hidden layer (L=2) receives as input the input value u=x·$w_2^{(L2)}$+$b_2$ calculated using the weight $w_2^{(L2)}$ and bias $b_2$. This input value "u" is converted by the Sigmoid function σ (x·$w_2^{(L2)}$+$b_2$) and output as the output value $z_2$.

On the other hand, the node of the output layer (L=3) receives as input the output values $z_1$ and $z_2$ of the nodes of the hidden layer (L=2). At the node of the output layer, the respectively corresponding weights $w_1^{(y)}$ and $w_2^{(y)}$ are used to calculate the sum input value u(Σz·w=$z_1$·$w_1^{(y)}$+$z_2$·$w_2^{(y)}$). As explained above, in the embodiments according to the present invention, at the node of the output layer, an identity function is used. Therefore, from the node of the output layer, the sum input value "u" calculated at the node of the output layer is output as is as the output value "y".

Figure 4B:
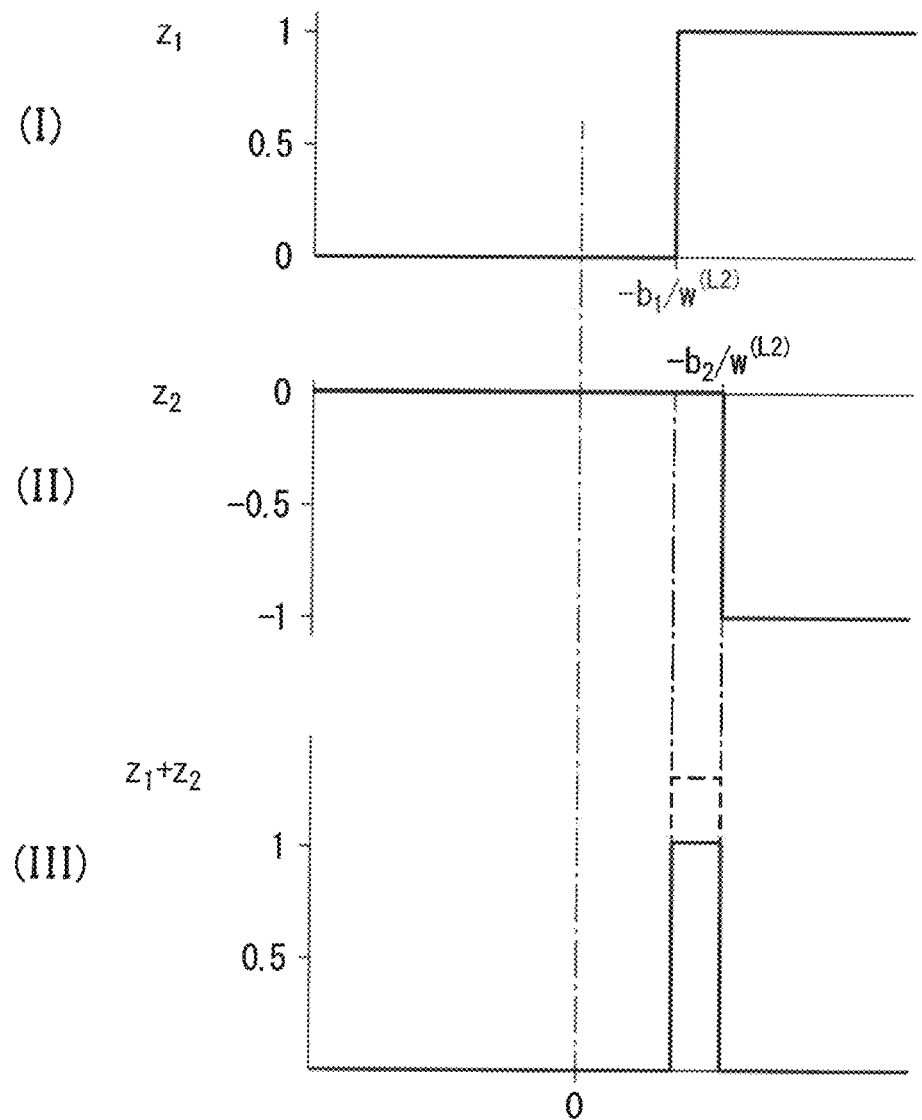

FIG. 4B shows a case where the value of the Sigmoid function σ is made to change in steps as shown in FIG. 3B by increasing the value of the weights $w_1^{(L2)}$ and $w_2^{(L2)}$. In FIG. 4B(I), the output value $z_1$ from a node of one hidden layer (L=2) when the weight $w_1^{(L2)}$ and bias $b_1$ are set so that the value of the Sigmoid function σ(x·$w_1^{(L2)}$+$b_1$) increases in steps at x=−$b_1$/$w_1^{(L2)}$ is shown. In addition, in FIG. 4B(II), the output value $z_1$ from a node of one hidden layer (L=2) when the weight $w_1^{(L2)}$ and bias $b_1$ are set so that the value of the Sigmoid function σ(x·$w_1^{(L2)}$+$b_1$) decreases in steps at x=−$b_2$/$w_2^{(L2)}$ which is slightly larger than x=−$b_1$/$w_1^{(L2)}$ is shown. Further, in FIG. 4B(III), the sum ($z_1$+$z_2$) of the output values $z_1$ and $z_2$ from the nodes of the hidden layer (L=2) is shown by the solid line. Note that, as shown in FIG. 4A, the output values $z_1$ and $z_2$ are multiplied with the respectively corresponding weights $w_1^{(y)}$ and $w_2^{(y)}$. In FIG. 4B(III), the change in the output value "y" when $w_1^{(y)}$ and $w_2^{(y)}$>1 is shown by the broken line.

Figure 5A:
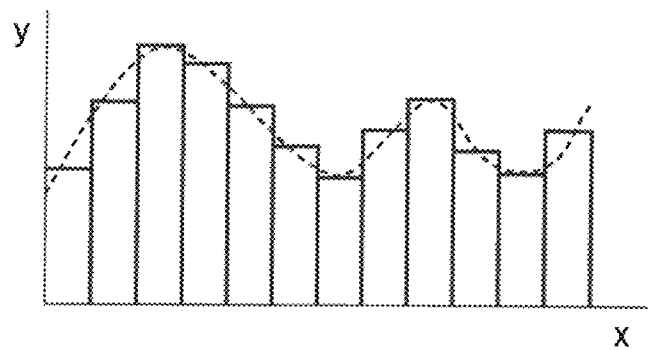
FIG. 5A is a view showing an output value from a node of an output layer.
Figure 5B:
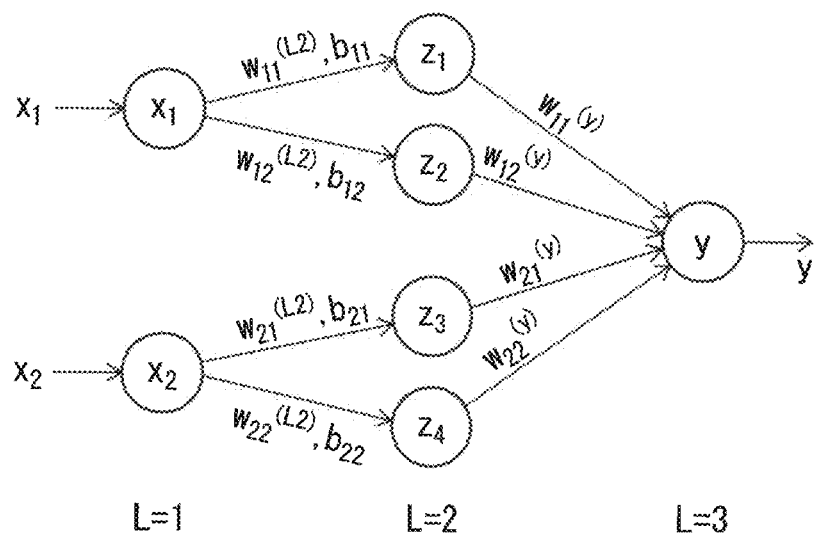
FIG. 5B is a view showing a neural network.
Figure 5C:
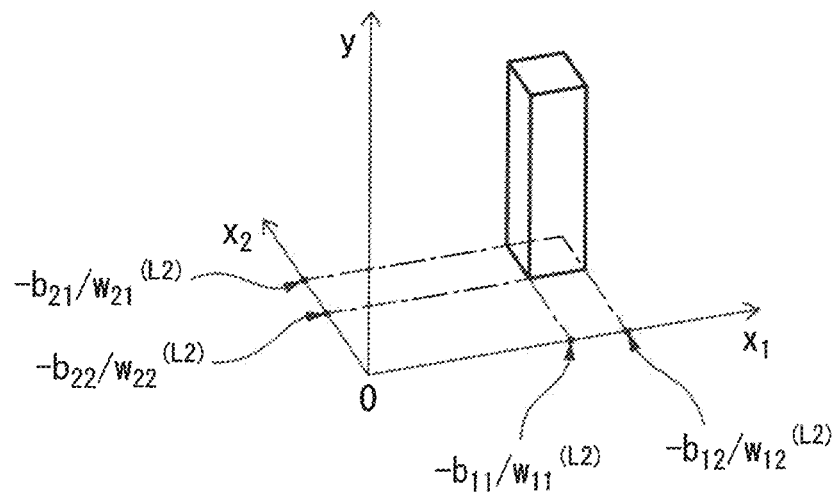
FIG. 5C is a view showing an output value from a node of an output layer.

In this way, in the neural network shown in FIG. 4A, from the pair of nodes of the hidden layer (L=2), a bar-shaped output value "y" such as shown in FIG. 4B(III) is obtained. Therefore, if increasing the number of paired nodes in the hidden layer (L=2) and suitably setting the values of the weights "w" and biases "b" at the nodes of the hidden layer (L=2), it becomes possible to express a function approximating the function y=f(x) such as shown by the curved line of the broken line in FIG. 5A. Note that, in FIG. 5A, the bars are drawn contiguous with each other, but in actuality the bars sometimes partially overlap. Further, in actuality, the value of "w" is not infinitely large, so the bars do not become precise bar shapes but become curved shapes like the top half of the curved part shown by $\sigma_3$ in FIG. 3B. Note that, while a detailed explanation will be omitted, as shown in FIG. 5B, if providing pairs of nodes at the hidden layer (L=2) respectively corresponding to the two different input values $x_1$ and $x_2$, as shown in FIG. 5C, column-shaped output values "y" corresponding to the input values $x_1$ and $x_2$ are obtained. In this case, if providing a large number of paired nodes at the hidden layer (L=2) for the input values $x_1$, $x_2$, a plurality of column-shaped output values "y" respectively corresponding to the different input values $x_1$ and $x_2$ are obtained. Therefore, it will be understood that it is possible to express a function showing the relationship between the input values $x_1$ and $x_2$ and the output values "y". Note that, in the case of three or more different input values "x" as well, similarly, it is possible to express a function showing the relationship between the input values "x" and the output values "y". When there is one input value, the function is expressed on a two-dimensional plane by the one input value+one output value. When there are two input values, the function is expressed in a three-dimensional space by the two input values+one output value. That is, when there are "n" input values, the function is expressed on an n+1 dimensional plane by the n input value+one output value. Note that it is not possible to express a space of a four-dimensional or higher plane on a sheet of paper, so such an illustration is omitted.

In the present embodiment, as the activation function, a Sigmoid function is selected, but in principle it may also be a function which monotonously increases and can be differentiated. In addition, when it is difficult to analytically find a function in case where a local minimum value (or a local minimum value) of the later explained error function (cost function) is used, the gradient descent method is used, and the reason for using a Sigmoid function is to facilitate calculation by using the later explained error back propagation method when using the gradient descent method. Therefore, if calculation by the gradient descent method is possible, a Sigmoid function need not be used. Further, the gradient descent method is used because analytic calculation is not possible, but if analytic calculation is possible, there is no need to use the gradient descent method.

Learning in Neural Network

On the other hand, in the embodiments according to the present invention, an error backpropagation algorithm is used to learn the values of the weights "w" and biases "b" in a neural network. This error backpropagation algorithm is known. Therefore, the error backpropagation algorithm will be explained simply below in its outlines. Note that, a bias "b" is one kind of weight "w", so in the following explanation, a bias "b" is deemed one type of weight "w". Now then, in the neural network such as shown in FIG. 2, if the weight at the input value $u^{(L)}$ to the nodes of each layer of L=2, L=3, or L=4 is expressed by $w^{(L)}$, the differential due to the weight $w^{(L)}$ of the error function E, that is, the gradient $\partial E/\partial w^{(L)}$, can be rewritten as shown in the following formula:

$$\partial E/\partial w^{(L)} = (\partial E/\partial u^{(L)})(\partial u^{(L)}/\partial w^{(L)}) \quad (1)$$

where, $z^{(L-1)} \cdot \partial w^{(L)} = \partial u^{(L)}$, so if $(\partial E/\partial u^{(L)}) = \delta^{(L)}$, the above formula (1) can be shown by the following formula:

$$\partial E/\partial w^{(L)} = \delta^{(L)} \cdot z^{(L-1)} \quad (2)$$

Here, if $u^{(L)}$ fluctuates, fluctuation of the error function E is caused through the change in the sum input value $u^{(L+1)}$ of the following layer, so $\delta^{(L)}$ can be expressed by the following formula.

$$\delta^{(L)} = (\partial E/\partial u^{(L)}) = \sum_{k=1}^{k}(\partial E/\partial u_k^{(L+1)})(\partial u_k^{(L+1)}/\partial u^{(L)})(k=1,2\ldots) \quad (3)$$

where, if $z^{(L)} = f(u^{(L)})$, the input value $u_k^{(L+1)}$ appearing at the right side of the above formula (3) can be expressed by the following formula:

$$\text{Input value } u_k^{(L+1)} = \sum_{k=1}^{k} w_k^{(L+1)} z^{(L)} = \sum_{k=1}^{k} w_k^{(L+1)} \cdot f(u^{(L)}) \quad (4)$$

where, the first term $(\partial E/\partial u^{(L+1)})$ at the right side of the above formula (3) is $\delta^{(L+1)}$, and the second term $(\partial u_k^{(L+1)}/\partial u^{(L)})$ at the right side of the above formula (3) can be expressed by the following formula:

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \quad (5)$$

Therefore, $\delta^{(L)}$ is expressed by the following formula:

$$\delta^{(L)} = \sum_{k=1}^{k} w_k(L+1) \cdot \delta^{(L+1)} \cdot f'(u^{(L)}) \quad (6)$$

That is, $\delta^{(L-1)} = \sum_{k=1}^{k} w_k(L) \cdot \delta^{(L)} \cdot f'(u^{(L-1)})$ That is, if $\delta^{(L+1)}$ is found, it is possible to find $\delta^{(L)}$.

Now then, when training data $y_t$ is found for a certain input value, and the output value from the output layer corresponding to this input value is "y", if the square error is used as the error function, the square error E is found by $E=\frac{1}{2}(y-y_t)^2$. In this case, at the node of the output layer (L=4) of FIG. 2, the output value "y" becomes $f(u^{(L)})$, therefore, in this case, the value of $\delta^{(L)}$ at the node of the output layer (L=4) becomes like in the following formula:

$$\delta^{(L)} = \partial E/\partial u^{(L)} = (\partial E/\partial y)(\partial y/\partial u^{(L)}) = (y-y_t) \cdot f'(u^{(L)}) \quad (7)$$

In this regard, in the embodiments of the present invention, as explained above, $f(u^{(L)})$ is an identity function and $f'(u^{(L)})=1$. Therefore, $\delta^{(L)} = y - y_t$ and $\delta^{(L)}$ are found.

If $\delta^{(L)}$ is found, the $\delta^{(L-1)}$ of the previous layer is found by using the above formula (6). The $\delta$ of the previous layer is successively found in this way. Using these values of $\delta$, from the above formula (2), the differential of the error function E, that is, gradient $\partial E/\partial w^{(L)}$, is found for each weight "w". If the gradient $\partial E/\partial w^{(L)}$ is found, this gradient $\partial E/\partial w^{(L)}$ is used to update the value of the weight "w" so that the value of the error function E decreases. That is, the value of the weight "w" is learned. Note that, when as the training data, a batch or minibatch is used, as the error function E, the following mean squared error E is used:

$$\text{Mean Squared error } E = \frac{1}{n} \sum_{k=1}^{k} \frac{1}{2}(y_k - y_t)^2 \quad (8)$$

($k = 1, 2 \ldots$, $n$ is total number of training data)

On the other hand, if online learning designed to sequentially calculate the square error is performed, as the error function E, the above square error E is used.

Embodiments of Present Invention

Now then, in an internal combustion engine, "fuel increasing control" for increasing the amount of fuel injection to lower the temperature of the exhaust purification catalyst by the latent heat of evaporation of the fuel to prevent the exhaust purification catalyst from overheating when the temperature of the exhaust purification catalyst exceeds a certain setting, that is, "OT increase control", is performed, and "$SO_X$ release control" for releasing the stored $SO_X$ from the $NO_X$ storage and reduction catalyst by making the air-fuel ratio of the exhaust gas flowing into the $NO_X$ storage and reduction catalyst rich in the state where the temperature of the $NO_X$ storage and reduction catalyst is raised to the $SO_X$ release temperature when a large amount of $SO_X$ is stored in the $NO_X$ storage and reduction catalyst is performed. These OT increase control and $SO_X$ release control are performed according to the temperature of the catalyst, and accordingly, to perform such OT increase control and $SO_X$ release control, it is necessary to estimate the temperature of the catalyst.

Therefore, in the past, the relationships among several engine operating parameters believed to affect the temperature of the catalyst and the catalyst temperature were found in advance by experiments, a plurality of maps showing these relationships were prepared, and the temperature of the catalyst was found from these maps. However, which operating parameters the temperature of the catalyst has strong correlation with in values has not been sufficiently studied. Further, even if there is correlation, the correlation is complicated, so what kind of correlation there is has been unknown. Since the correlations between the engine operating parameters and the catalyst temperature are complicated, it is difficult to express the relationships among the engine operating parameters and the catalyst temperature by a plurality of maps. Therefore, when trying to estimate the temperature of the catalyst from a plurality of maps, obtaining a high precision of estimation is difficult.

Further, the HC and CO contained in exhaust gas react with the oxygen contained in the exhaust gas and the oxygen deposited on the exhaust purification catalyst on the exhaust purification catalyst to generate the heat of oxidation reaction. This heat of oxidation reaction generated in the exhaust purification catalyst greatly affects the temperature of the catalyst. Therefore, it can be said to be preferable to also use the HC concentration or CO concentration in the exhaust gas as one of the engine operating parameters for estimating the temperature of the catalyst. However, the number of maps is limited, so it is difficult to further add maps relating to the HC concentration and CO concentration. Also, even if adding maps relating to the HC concentration and CO concentration, the relationships between the engine operating parameters, including the HC concentration and CO concentration, and the catalyst temperature would become further complicated, so obtaining a high precision of estimation of the catalyst temperature would be difficult. Therefore, the present invention uses a neural network to precisely predict the temperature of the exhaust purification catalyst of the internal combustion engine.

Figure 6A:
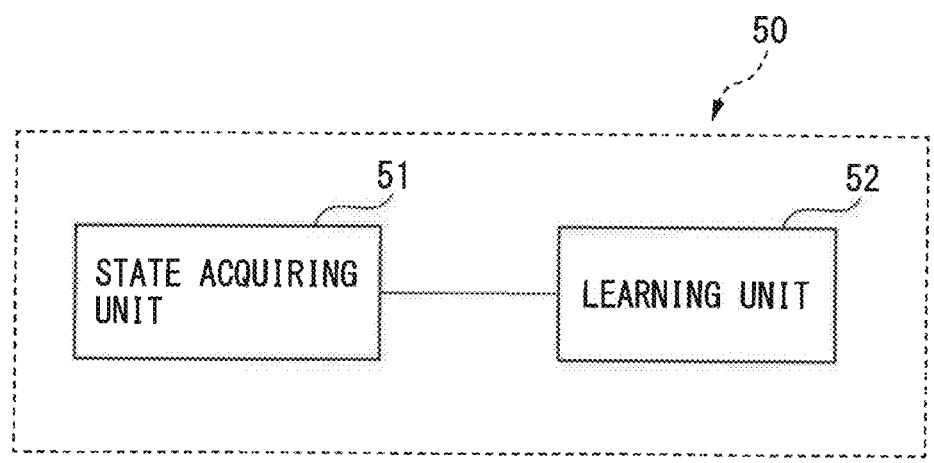
FIG. 6A and FIG. 6B respectively are a functional block diagram of a first embodiment and a view showing a learning routine.

Next, a first embodiment according to the present invention will be explained in brief. As explained above, the present invention uses a neural network to precisely predict a temperature of an exhaust purification catalyst of an internal combustion engine. For this purpose, a machine learning device is used. In this first embodiment, as the operating parameters having an effect on the temperature of the catalyst, that is, as the variables showing the operating state, the values of the engine speed, the engine load rate, the air-fuel ratio of the engine, the ignition timing of the engine, the HC or CO concentration of the exhaust gas flowing into the exhaust purification catalyst, and the temperature of the exhaust purification catalyst are employed. As shown in FIG. 6A, the machine learning device 50 comprises a state acquiring unit 51 for acquiring state variables comprised of the engine speed, the engine load rate, the air-fuel ratio of the engine, the ignition timing of the engine, the HC or CO concentration of the exhaust gas flowing into the exhaust purification catalyst, and the temperature of the exhaust purification catalyst.

Further, using the state variables, a training data set is prepared showing the relationships among the engine speed, the engine load rate, the air-fuel ratio of the engine, the ignition timing of the engine, and the HC or CO concentration of the exhaust gas flowing into the exhaust purification catalyst and the temperature of the exhaust purification catalyst. As shown in FIG. 6A, the machine learning device 50 is provided with a learning unit 52 for learning the temperature of the exhaust purification catalyst according to this training data set. That is, the machine learning device 50 shown in this example is comprised of a state acquiring unit 51 for acquiring state variables comprised of the engine speed, the engine load rate, the air-fuel ratio of the engine, the ignition timing of the engine, the HC or CO concentration of the exhaust gas flowing into the exhaust purification catalyst, and the temperature of the exhaust purification catalyst and a learning unit 52 learning the temperature of the exhaust purification catalyst according to the training data set comprised of these state variables.

Figure 6B:
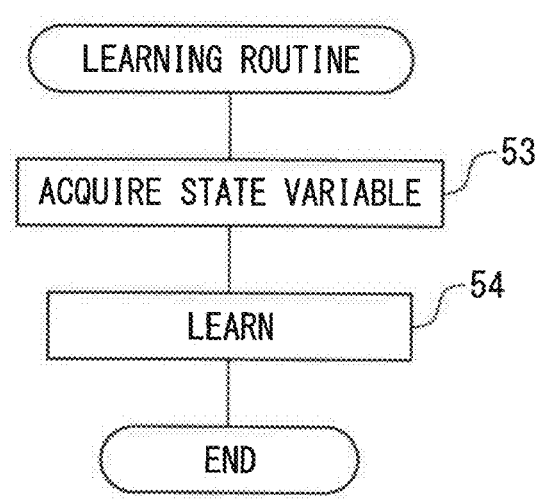

FIG. 6B shows a learning routine performed in the machine learning device 50 shown in FIG. 6A. Referring to FIG. 6B, first, at step 53, state variables comprised of the engine speed, the engine load rate, the air-fuel ratio of the engine, the ignition timing of the engine, the HC or CO concentration of the exhaust gas flowing into the exhaust purification catalyst, and the temperature of the exhaust purification catalyst are acquired. Next, at step 54, the temperature of the exhaust purification catalyst is learned according to the training data set comprised of these state variables.

Figure 7:
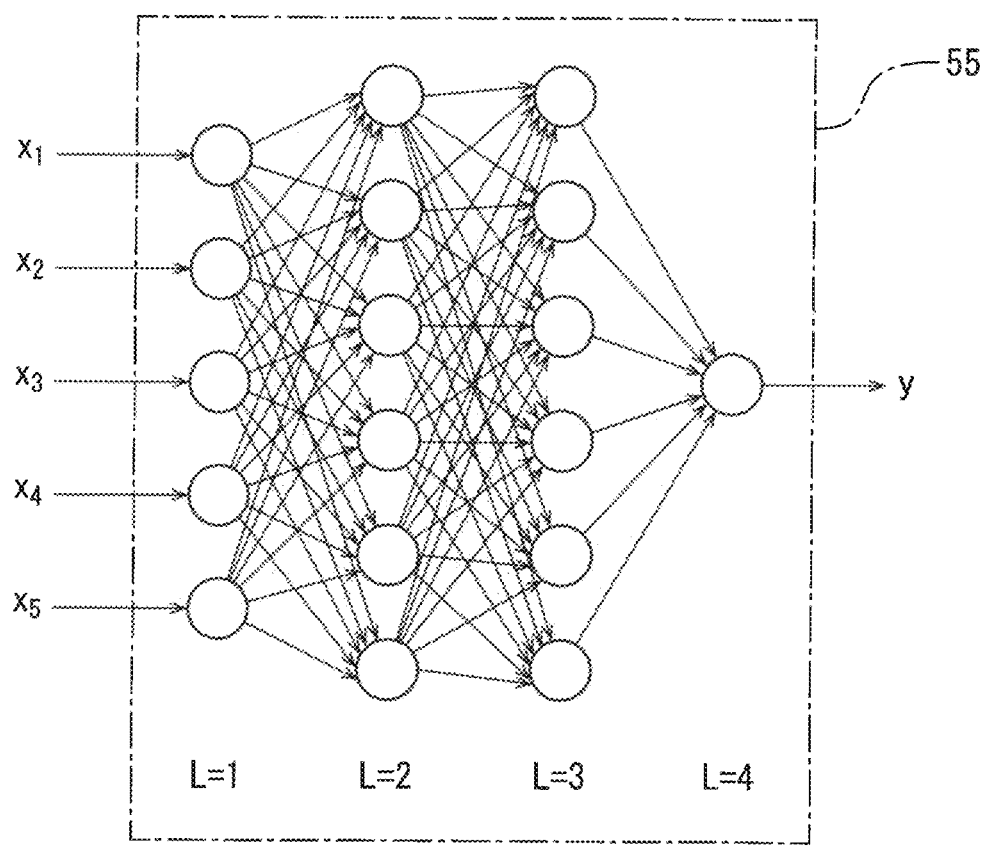
FIG. 7 is a view showing a neural network used in the first embodiment according to the present invention.

Next, referring to FIG. 7, the first embodiment according to the present invention will be explained in more detail. FIG. 7 shows a machine learning device 55 for predicting a catalyst temperature. This machine learning device 55 is comprised of a neural network formed inside the ROM 32 of the electronic control unit 30. Note that, in FIG. 7 as well, in the same way as the neural network shown in FIG. 2, L=1 shows an input layer, L=2 and L=3 show hidden layers, and L=4 shows an output layer. As shown in FIG. 7, in this first embodiment, the input layer (L=1) is comprised of five nodes and the values of the five operating parameters $x_1$, $x_2$, $x_3$, $x_4$, and $x_5$ are input as input values to the nodes of the input layer (L=1). Note that, below, "$x_1$", "$x_2$", "$x_3$", "$x_4$", and "$x_5$" sometimes indicate input parameters and sometimes indicate values of the input parameters. On the other hand, FIG. 7 schematically shows a hidden layer (L=2) and a hidden layer (L=3) respectively having six nodes, but the number of these hidden layers may be any number, including one, and further the numbers of nodes of these hidden layers may be made any number. Note that the number of nodes of the output layer (L=4) is made one node. The output value from the node of the output layer is shown by "y".

Next, the input values showing the values of the operating parameters in FIG. 7, that is, the input values $x_1$, $x_2$, $x_3$, $x_4$, and $x_5$ of the input parameters, and the output value "y" of the output parameter will be explained. In the first embodiment according to the present invention, as explained above, as the operating parameters, that is, as the input parameters, the engine speed, the engine load rate, the air-fuel ratio of the engine, the ignition timing of the engine, and the HC or CO concentration of the exhaust gas flowing into the exhaust purification catalyst are employed. The values of the engine speed, engine load rate, air-fuel ratio of the engine, ignition timing of the engine, and HC or CO concentration of the exhaust gas flowing into the exhaust purification catalyst are respectively input as the input values $x_1$, $x_2$, $x_3$, $x_4$, and $x_5$ into the input layer (L=1). In this case, in the example shown in FIG. 7, "$x_1$" shows the engine speed, "$x_1$" shows the engine load rate, "$x_3$" shows the air-fuel ratio of the engine, "$x_4$" shows the ignition timing of the engine, and "$x_5$" shows the HC or CO concentration of the exhaust gas flowing into the exhaust purification catalyst. On the other hand, in the first embodiment according to the present invention, as the output parameter, the temperature of the exhaust purification catalyst 16 is employed. From the output layer (L=4), the output value "y" of the output parameter, that is, the estimated value "y" of the temperature of the exhaust purification catalyst 16, is output.

Next, the method of acquiring the different input values will be explained. First, the engine speed is calculated in the CPU 34 in the electronic control unit 30. This calculated value is used as the engine speed. Further, the engine load rate shows the ratio of the actual amount of intake air to the amount of intake air to the inside of the engine cylinders at the time of engine full load operation. In this case, for example, the amounts of intake air at the time of engine full load operation at certain reference intake air temperatures and intake air pressures are measured in advance with respect to typical engine speeds. The measured values are stored in a storage unit (ROM 32 or RAM 33) of the electronic control unit 30. On the other hand, an actual amount of intake air is found by correcting an amount of intake air detected by the intake air amount detector 10 to become the value at the above-mentioned reference intake air temperature and intake air pressure using the detected values of the pressure sensor 23 and temperature sensor 24. In the CPU 34, the engine load rate is calculated from the stored amounts of intake air at the time of engine full load operation and the corrected actual amount of intake air, and this calculated value is used as the engine load rate.

The air-fuel ratio of the engine is acquired from an output signal of the air-fuel ratio sensor 25. Further, the ignition timing of the engine is, for example, stored in advance as a function of the engine speed and the engine load rate in a storage unit (ROM 32 or RAM 33) of the electronic control unit 30. This ignition timing of the engine is calculated in the CPU 34 from the engine speed and the load factor of the engine, and this calculated value is used as the ignition timing of the engine. The HC or CO concentration in the exhaust gas flowing into the exhaust purification catalyst 16 is acquired from the output signal from the HC concentration sensor 26 or CO concentration sensor 26. In this case, either of the HC concentration sensor 26 or CO concentration sensor 26 is used. Note that, the HC concentration and the CO concentration can also be detected using a gas analyzer which samples the exhaust gas to analyze the components of the exhaust gas. On the other hand, the temperature of the exhaust purification catalyst 16 is acquired from the output signal of the temperature sensor 27.

Next, a learning data set used in this embodiment of the present invention will be simply explained. In this embodiment according to the present invention, the measured values of the input parameters and the measured value of the output parameter in different operating states when randomly changing the operating states of the engine are, as shown in FIG. 8, stored as the learning use data set in a storage unit (ROM 32 or RAM 33) of the electronic control unit 30. Note that, in FIG. 8, "No." shows the ordinal number of the operating state, and FIG. 8 shows the measured values of the input parameters and the measured value of the output parameter for N number of operating states. Note that, in FIG. 8, "$x_1$" shows the engine speed, "$x_2$" shows the engine load rate, "$x_3$" shows the air-fuel ratio of the engine, "$x_4$" shows the ignition timing of the engine, and "$x_5$" shows the HC or CO concentration of the exhaust gas flowing into the exhaust purification catalyst. On the other hand, "yt" shows the measured value of the output parameter, that is, the measured value of the temperature of the exhaust purification catalyst 16. The measured value yt of the temperature of the exhaust purification catalyst 16 is used as the training data.

For example, in the example shown in FIG. 8, the measured values of the input parameters $x_1$, $x_2$, $x_3$, $x_4$, and $x_5$ in the No. 1 operating state are respectively shown by "$a_1$", "$b_1$", "$c_1$", "$d_1$", and "$e_1$", while the value of the measured value yt of the temperature of the exhaust purification catalyst 16 is shown by "$f_1$". Similarly, the values of the input parameters $x_1$, $x_2$, $x_3$, $x_4$, and $x_5$ in the No. "n" operating state are respectively shown by "$a_n$", "$b_n$", "$c_n$", "$d_n$", and "$e_n$", while the value of the measured value yt of the temperature of the exhaust purification catalyst 16 is shown by "$f_n$". In the first embodiment according to the present invention, the learning use data set shown in FIG. 8 is used to learn the weight of the neural network of the machine learning device 55 shown in FIG. 7. One example of the learning routine of the weight of the neural network is shown in FIG. 9.

Figure 9:
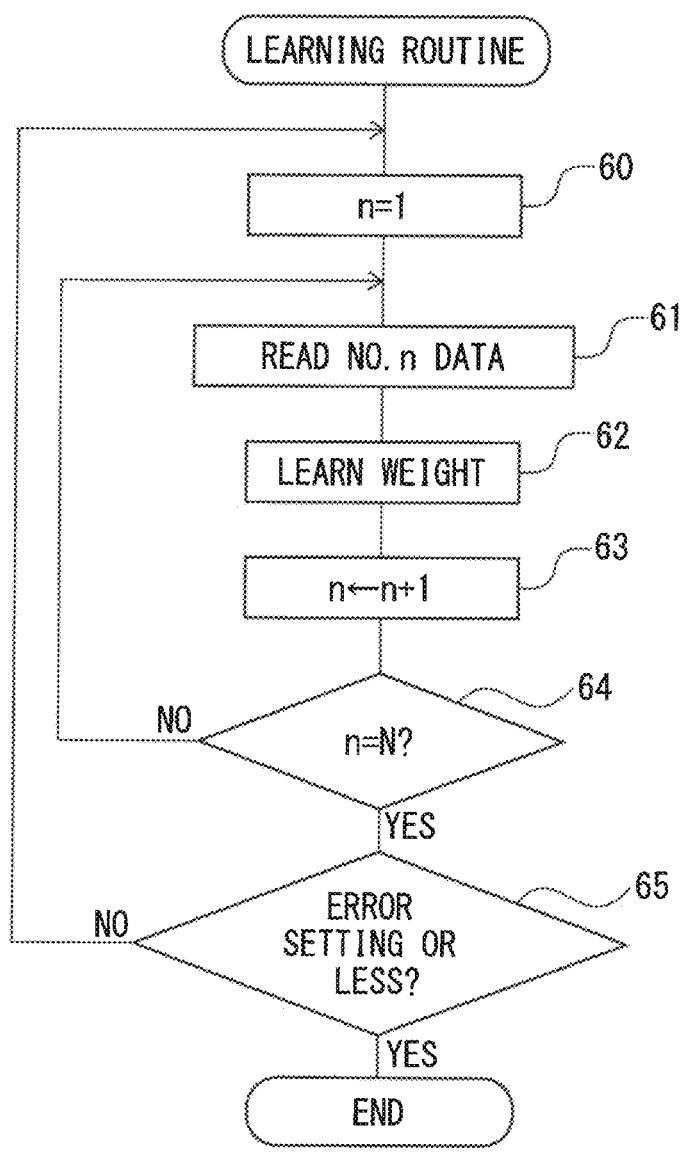
FIG. 9 is a flow chart showing a learning routine.

Referring to FIG. 9, first, at step 60, the ordinal number "No." showing the operating state in FIG. 8 is set to "1" (n=1). Next, at step 61, the learning use data set of the ordinal number No. "n" showing the operating state in FIG. 8 is read in. In this case, when the routine first proceeds to step 61, the learning use data of the No. 1 operating state in FIG. 8 is read in. If at step 61 the learning use data set of the No. "n" operating state is read in, the routine proceeds to step 62. At step 62, the values $a_n$, $b_n$, $c_n$, $d_n$, and $e_n$ of the input parameters $x_1$, $x_2$, $x_3$, $x_4$, and $x_5$ at the No. "n" learning use data set are input to the input layer (L=1) of FIG. 7 and the value $f_n$ of the measured value yt of the output parameter of the No. "n" learning use data set is used as the training data to learn the weight of the neural network.

At step 62, if the weight of the neural network is learned, the routine proceeds to step 63 where the ordinal number "n" of the operating state is incremented by "1" (n=n+1). Next, at step 64, it is judged if the ordinal number "n" of the operating state becomes N, that is, if the weight of the neural network has been learned for all of the learning use data sets shown in FIG. 8. If at step 64 it is judged that the ordinal number "n" of the operating states does not become N, the routine returns to step 61. As opposed to that, if at step 64 it is judged that the ordinal number "n" of the operating state becomes N, that is, if the weight of the neural network has been learned for all of the learning use data sets shown in FIG. 8, the routine proceeds to step 65.

At step 65, for example, the above formula (8) is used to calculate a square sum error E between the output value "y" and the training data yt of the neural network, and it is judged if this square sum error E becomes a preset error setting or less. When it is judged that the square sum error E becomes the preset error setting or less, the learning routine is ended. As opposed to this, when it is judged that the square sum error E does not become the preset error setting or less, the routine returns to step 60 and the weight of the neural network is again learned for all of the learning use data set shown in FIG. 8. Next, the weight of the neural network continues to be learned until the square sum error E becomes the preset error setting or less.

In this way, in this embodiment of the present invention, in a machine learning device 50 using a neural network to predict a temperature of an exhaust purification catalyst 16 of an internal combustion engine, a learning data set showing relationships among an engine speed, an engine load rate, an air-fuel ratio of the engine, an ignition timing of the engine, and an HC or CO concentration of the exhaust gas flowing into the exhaust purification catalyst and a temperature of the exhaust purification catalyst 16 is acquired, and the acquired engine speed, engine load rate, air-fuel ratio of the engine, ignition timing of the engine, and HC or CO concentration of the exhaust gas flowing into the exhaust purification catalyst are used as input parameters of the neural network. The acquired temperature of the exhaust purification catalyst is used as training data to learn a weight of the neural network, and the learned neural network is used to estimate the temperature of the exhaust purification catalyst 16.

On the other hand, in this embodiment of the present invention, as shown in FIG. 1, the internal combustion engine is provided with the electronic control unit 30. The electronic control unit 30 is provided with an input parameter value acquiring unit for acquiring the values of input parameters relating to operation of the engine, a processing unit for processing using a neural network comprised of an input layer, a hidden layer, and an output layer, and a storage unit. In this case, in the example shown in FIG. 1, the input port 35 forms the above-mentioned parameter value acquiring unit, the CPU 34 forms the above-mentioned processing unit, and the ROM 32 and RAM 33 form the above-mentioned storage unit. Note that, at the CPU 34, that is, the above-mentioned processing unit, the values of the operating parameters of the engine are input to the input layer, while the output value, which changes in accordance with the values of the operating parameters of the engine, is output from the output layer.

Therefore, in this embodiment of the present invention, the input parameter value acquiring unit acquires the engine speed, the engine load rate, the air-fuel ratio of the engine, the ignition timing of the engine, the HC or CO concentration in the exhaust gas flowing into the exhaust purification catalyst 16, and the temperature of the exhaust purification catalyst 16. The relationships among the engine speed, the engine load rate, the air-fuel ratio of the engine, the ignition timing of the engine, and the HC or CO concentration in the exhaust gas flowing into the exhaust purification catalyst 16 and the temperature of the exhaust purification catalyst 16 are stored as a learning use data set in the storage unit. The engine speed, the engine load rate, the air-fuel ratio of the engine, the ignition timing of the engine, and the HC or CO concentration in the exhaust gas flowing into the exhaust purification catalyst 16 stored in this storage unit as the learning use data set are used as input to the input layer of a neural network while the temperature of the exhaust purification catalyst 16 stored as learning use data set in the storage unit is used as training data to learn the weight of the neural network. The estimated value of the temperature of the exhaust purification catalyst 16 is output from the output layer of the learned neural network.

Figure 10A:
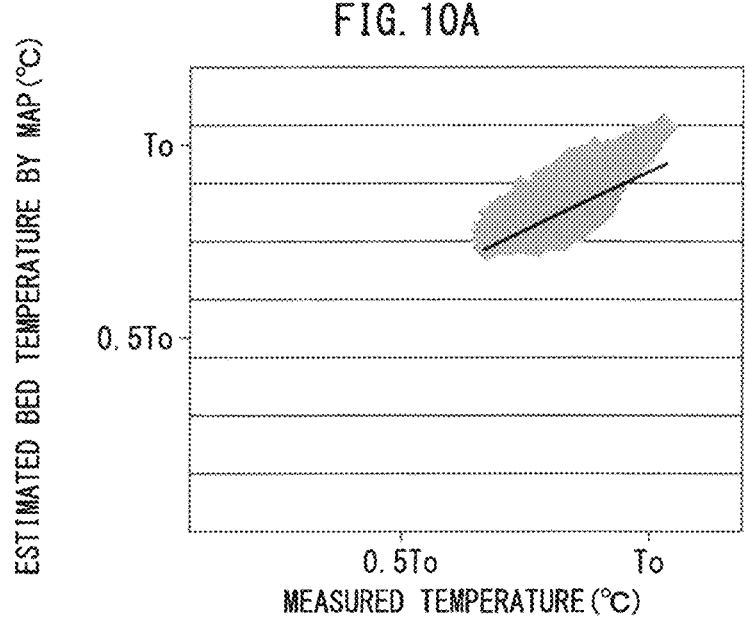
FIG. 10A and FIG. 10B are views showing an estimated bed temperature of an exhaust purification catalyst.

Next, based on the measured data, the precision of estimation when using the engine speed, the engine load rate, the air-fuel ratio of the engine, the ignition timing of the engine, and the HC or CO concentration in the exhaust gas flowing into the exhaust purification catalyst 16 as the input parameters of the neural network and using the acquired temperature of the exhaust purification catalyst 16 as the training data to learn the weight of the neural network will be explained. FIG. 10A shows the relationship between the estimated temperature $T_0$ and measured temperature $T_0$ of the exhaust purification catalyst 16 when using a plurality of maps showing the relationships of the engine speed, the engine load rate, the air-fuel ratio of the engine, the ignition timing of the engine, and the temperature of the exhaust purification catalyst 16 to estimate the temperature of the exhaust purification catalyst 16.

Figure 10B:
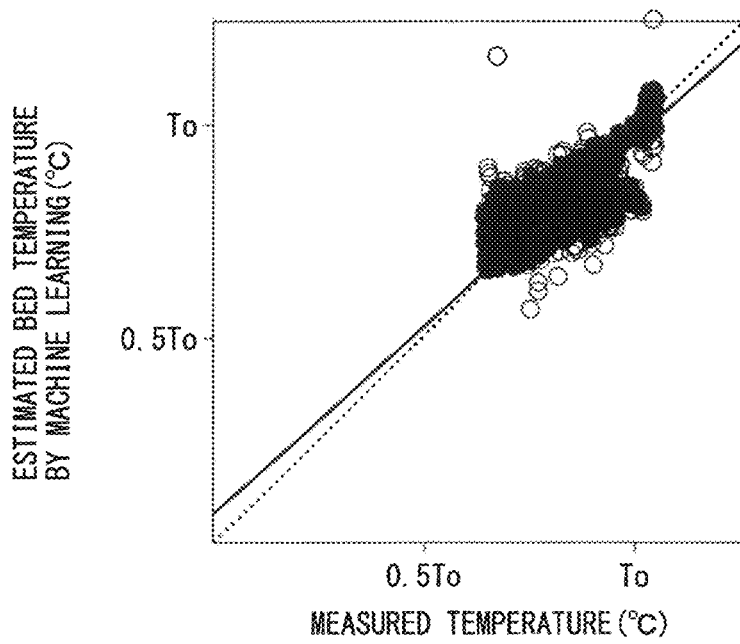

On the other hand, FIG. 10B shows the relationship between the estimated temperature $T_0$ and measured temperature $T_0$ of the exhaust purification catalyst 16 when using the engine speed, the engine load rate, the air-fuel ratio of the engine, the ignition timing of the engine, and the CO concentration in the exhaust gas flowing into the exhaust purification catalyst 16 as the input parameters of the neural network and using the acquired temperature of the exhaust purification catalyst 16 as the training data to learn the weight of the neural network. As will be understood from a comparison of FIG. 10A and FIG. 10B, it will be understood that compared with the case shown in FIG. 10A, the precision of estimation of the temperature of the exhaust purification catalyst 16 is higher in the case shown in FIG. 10B. Incidentally, the correlation coefficient $R^2$ between the estimated temperature and the measured temperature in the case shown in FIG. 10A is 0.4881, while the correlation coefficient $R^2$ between the estimated temperature and the measured temperature in the case shown in FIG. 10B is 0.8973.

Figure 11A:
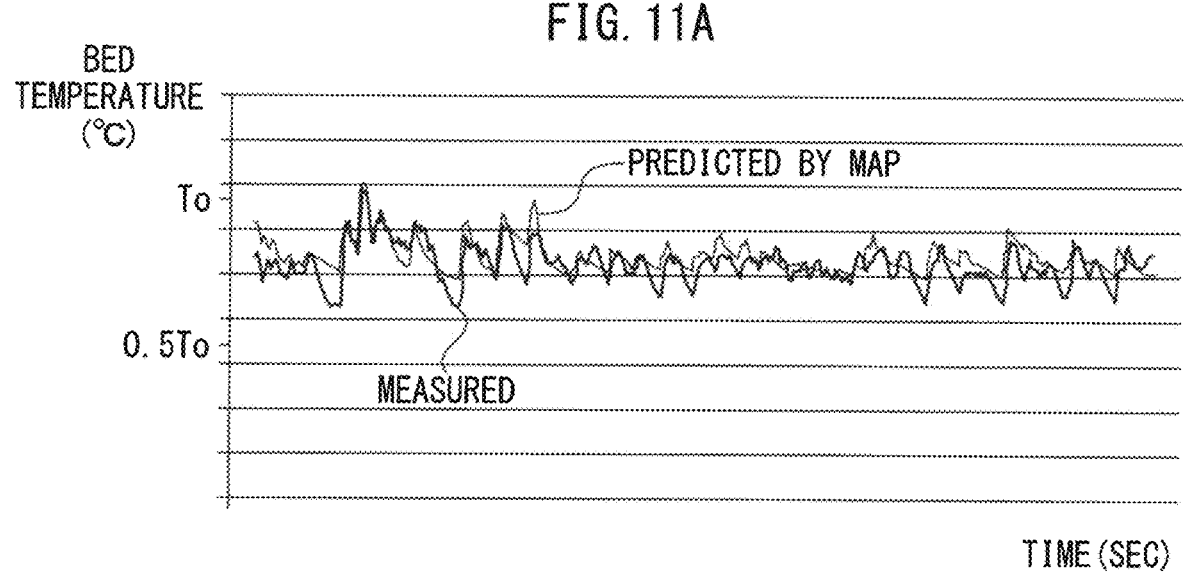
FIG. 11A and FIG. 11B are views showing an estimated bed temperature of an exhaust purification catalyst.
Figure 11B:
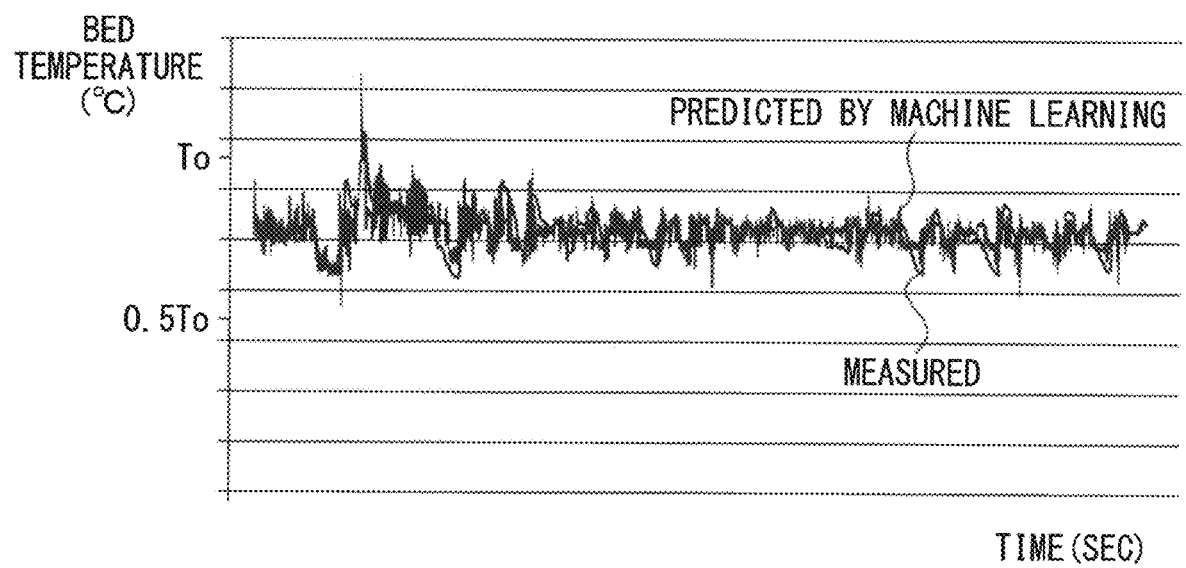

On the other hand, FIG. 11A shows a comparison of the temporal changes of the measured temperature $T_0$ and the estimated temperature $T_0$ when using a plurality of maps showing the relationship of the engine speed, the engine load rate, the air-fuel ratio of the engine, the ignition timing of the engine, and the temperature of the exhaust purification catalyst 16 to estimate the temperature of the exhaust purification catalyst 16, while FIG. 11B shows a comparison of the temporal changes of the estimated temperature $T_0$ and measured temperature $T_0$ of the exhaust purification catalyst 16 when using the engine speed, the engine load rate, the air-fuel ratio of the engine, the ignition timing of the engine, and the CO concentration in the exhaust gas flowing into the exhaust purification catalyst 16 as the input parameters of the neural network and using the acquired temperature of the exhaust purification catalyst 16 as training data to learn the weight of the neural network. If comparing FIG. 11A and FIG. 11B, it will be understood that compared with the case shown in FIG. 11A, the precision of estimation of the temperature of the exhaust purification catalyst 16 is higher in the case shown in FIG. 11B.

Figure 12:
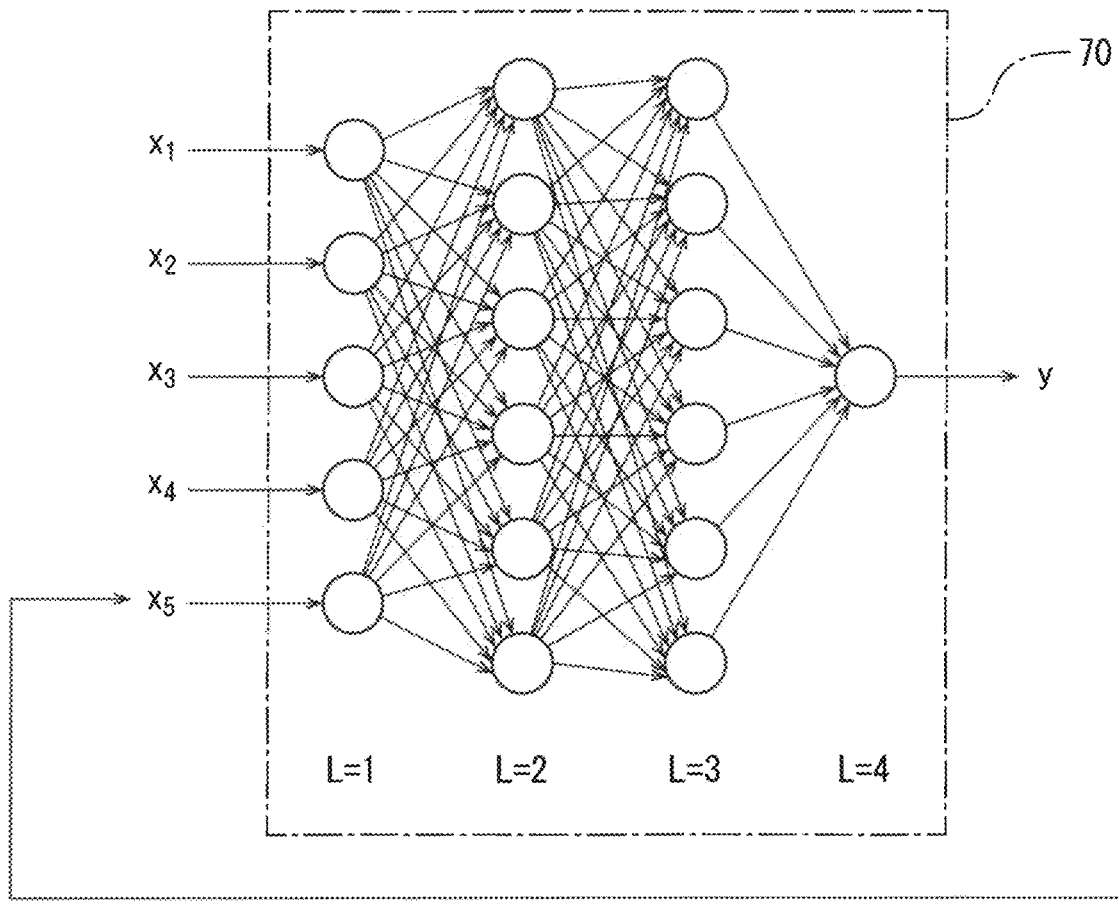
FIG. 12 is a view showing a neural network used in a second embodiment according to the present invention.
Figure 12:
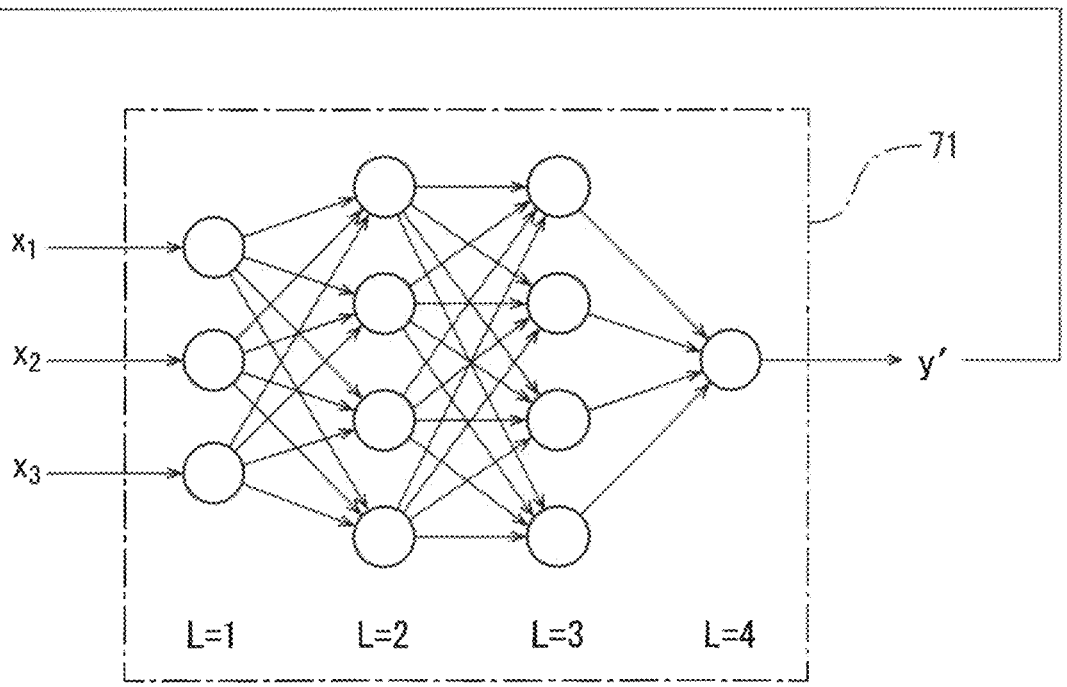

Next, referring to FIG. 12, a second embodiment according to the present invention will be explained. This second embodiment estimates the HC or CO concentration in the exhaust gas flowing into the exhaust purification catalyst 16 and uses the estimated value of the HC or CO concentration in this exhaust gas to predict the catalyst temperature. Therefore, in the second embodiment according to the present invention, as shown in FIG. 12, the machine learning device is comprised of a machine learning device 70 for predicting the catalyst temperature and a machine learning device 71 for estimating the HC or CO concentration in the exhaust gas flowing into the exhaust purification catalyst 16. Note that these machine learning device 70 and 71 are comprised of neural networks formed inside the ROM 32 of the electronic control unit 30.

First, the machine learning apparatus 71 will be explained. In this machine learning device 71, the input layer (L=1) is comprised of three nodes, and the values of three operating parameters $x_1$, $x_2$, and $x_3$ are input as input values to the nodes of the input layer (L=1). Note that, as explained above, "$x_1$", "$x_2$", and "$x_3$" sometimes indicate input parameters and sometimes indicate values of the input parameters. Further, for this machine learning device 71, FIG. 12 schematically shows a hidden layer (L=2) and a hidden layer (L=3) respectively having four nodes, but the number of the hidden layers may be any number including one. The numbers of nodes of these hidden layers may also be made any numbers. Note that, the number of nodes of the output layer (L=4) is made a single node and the output value from the node of the output layer is shown by "y'".

Next, the input values showing the values of the operating parameters in the machine learning device 71, that is, the input values $x_1$, $x_2$, and $x_3$ of the input parameters, and the output value y' of the output parameter will be explained. In this second embodiment, as the operating parameters, that is, the input parameters, the engine speed, the engine load rate, and the air-fuel ratio of the engine having a strong effect on the HC or CO concentration in the exhaust gas flowing into the exhaust purification catalyst 16 are employed. The values of the engine speed, the engine load rate, and the air-fuel ratio of the engine are respectively input as input values $x_1$, $x_2$, and $x_3$ to the input layer (L=1). That is, in this second embodiment as well, in the same way as the first embodiment, "$x_1$" shows the engine speed, "$x_2$" shows the engine load rate, and "$x_3$" shows the air-fuel ratio of the engine. On the other hand, in this second embodiment, as the output parameter of the machine learning device 71, the HC or CO concentration in the exhaust gas flowing into the exhaust purification catalyst 16 is employed. From the output layer (L=4), the output value y' of the output parameter, that is, the estimated value y' of the HC or CO concentration in the exhaust gas flowing into the exhaust purification catalyst 16, is output.

On the other hand, the machine learning device 70 is comprised of a neural network of the same configuration as the machine learning device 55 shown in FIG. 7. Therefore, the explanation of the configuration of the neural network of the machine learning device 70 will be omitted, while only the input values showing the values of the operating parameters, that is, the input values $x_1$, $x_2$, $x_3$, $x_4$, and $x_5$ of the input parameters, and the output value "y" of the output parameter will be explained. In this second embodiment, the input values $x_1$, $x_2$, $x_3$, and $x_4$ are the same as in the machine learning device 55 shown in FIG. 7, "$x_1$" shows the engine speed, "$x_2$" shows the engine load rate, "$x_3$" shows the air-fuel ratio of the engine, and "$x_4$" shows the ignition timing of the engine. As opposed to this, the input value $x_5$ differs from that of the machine learning device 55 shown in FIG. 7. As schematically shown in FIG. 12, the output value y' from the machine learning device 71, that is, the estimated value y' of the HC or CO concentration in the exhaust gas flowing into the exhaust purification catalyst 16, is input as the input value $x_5$ to the input layer (L=1).

That is, in the machine learning device 70, as the operating parameters, that is, as the input parameters, the engine speed, the engine load rate, the air-fuel ratio of the engine, the ignition timing of the engine, and the estimated values of the HC or CO concentration in the exhaust gas flowing into the exhaust purification catalyst 16 are employed. The values of the engine speed, the engine load rate, the air-fuel ratio of the engine, and the ignition timing of the engine and the estimated value of the HC or CO concentration in the exhaust gas flowing into the exhaust purification catalyst 16 are respectively input as the input values $x_1$, $x_2$, $x_3$, $x_4$, and $x_5$ to the input layer (L=1). On the other hand, in the machine learning device 70, as the output parameter, the temperature of the exhaust purification catalyst 16 is employed. From the output layer (L=4), the output value "y" of the output parameter, that is, the estimated value "y" of the temperature of the exhaust purification catalyst 16, is output.

Next, referring to FIG. 13A and FIG. 13B, the learning use data set used in the second embodiment according to the present invention will be briefly explained. FIG. 13A shows the learning use data set for estimating the HC or CO concentration in the exhaust gas flowing into the exhaust purification catalyst 16 in the machine learning device 71 of FIG. 12, while FIG. 13B shows the learning use data set for predicting the catalyst temperature in the machine learning device 70 of FIG. 12. First, the learning use data set for estimating the HC or CO concentration in the exhaust gas shown in FIG. 13A will be explained.

In the case of using the machine learning device 71 to estimate the HC or CO concentration in the exhaust gas as well, the measured values of the values of the input parameters and the measured value of the value of the output parameter in different operating states when randomly changing the operating states of the engine are, as shown in FIG. 13A, stored as the learning use data set in a storage unit (ROM 32 or RAM 33) of the electronic control unit 30. Note that, for this learning use data set as well, as shown in FIG. 13A, the measured values of the input parameters and the measured value of the output parameter are found for N number of operating states. On the other hand, as explained above, in FIG. 13A, "$x_1$" shows the engine speed, "$x_1$" shows the engine load rate, and "$x_3$" shows the air-fuel ratio of the engine. As opposed to this, "yt'" shows the measured value of the HC or CO concentration in the exhaust gas flowing into the exhaust purification catalyst 16, that is, the training data.

In this case, as explained above, the HC or CO concentration in the exhaust gas flowing into the exhaust purification catalyst 16 is acquired from the output signal of the HC concentration sensor 26 or CO concentration sensor 26 or is detected using a gas analyzer for analyzing the components of sampled exhaust gas. In the example shown in FIG. 13A, the values of the input parameters $x_1$, $x_2$, and $x_3$ in the No. 1 operating state are shown by "$a_1$," "$b_1$," and "$c_1$," while the measured value yt' of the HC or CO concentration in the exhaust gas, that is, the value of the teacher data yt', is shown by "$y_1$'". In the same way, the values of the input parameters $x_1$, $x_2$, and $x_3$ in the No. "n" operating state are respectively shown by $a_n$, $b_n$, and $c_n$, while the measured value yt' of the HC or CO concentration in the exhaust gas, that is, the value of the teacher data yt', is shown as "$y_n$'". In the second embodiment according to the present invention, the learning use data set shown in FIG. 13A is used to learn the weight of the neural network of the machine learning apparatus 71 shown in FIG. 12. The weight of the neural network is learned using the learning routine shown in FIG. 9.

In this way, in the second embodiment according to the present invention, the engine speed, the engine load rate, and the air-fuel ratio of the engine acquired from the learning use data set are used as the input parameters of the neural network and the HC or CO concentration in the exhaust gas flowing into the exhaust purification catalyst 16 acquired from the learning use data set is used as the training data to learn the weight of the neural network and this learned neural network is used to find the estimated value of the HC or CO concentration in the exhaust gas flowing into the exhaust purification catalyst 16.

Next, the learning use data set for predicting the catalyst temperature shown in FIG. 13B will be explained. The learning use data set shown in FIG. 13B is similar to the learning use data set shown in FIG. 8. It differs from the learning use data set shown in FIG. 8 just in using as the input value of the input parameter $x_5$ the output value y' from the machine learning device 71, that is, the estimated value y' of the HC or CO concentration in the exhaust gas flowing into the exhaust purification catalyst 16. The learning use data set shown in FIG. 13B is the same as the learning use data set shown in FIG. 8 on the other points. That is, in the learning use data set shown in FIG. 13B, "$x_1$" shows the engine speed, "$x_2$" shows the engine load rate, "$x_3$" shows the air-fuel ratio of the engine, and "$x_4$" shows the ignition timing of the engine.

Note that, the measured values $a_n$, $b_n$, and $c_n$ (n=1, 2, . . . N) of the operating states at the three input values $x_1$, $x_2$, and $x_3$ of FIG. 13A are respectively the same values as the measured values $a_n$, $b_n$, and $c_n$ (n=1, 2, . . . N) of the operating states at the three input values $x_1$, $x_2$, and $x_3$ of FIG. 13B. In the second embodiment according to the present invention, the learning use data set shown in FIG. 13B is used to learn the weight of the neural network of the machine learning device 70 shown in FIG. 12. This weight of the neural network is learned using the learning routine shown in FIG. 9.

Figure 14A:
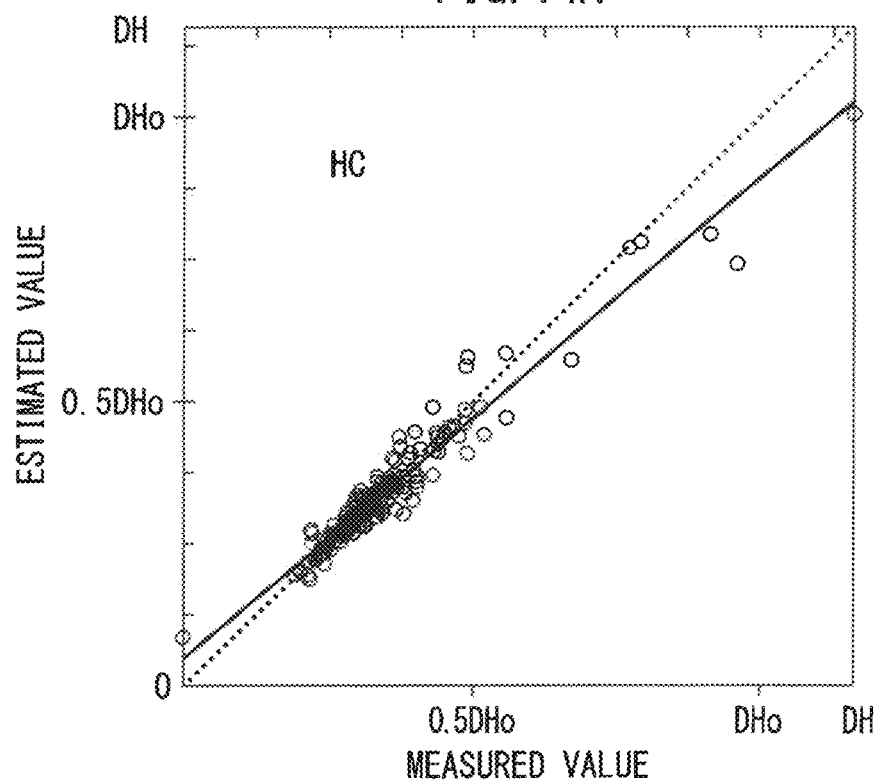
FIG. 14A and FIG. 14B respectively are views showing a relationship between measured values and predicted values of HC concentration and a relationship between measured values and predicted values of CO concentration.
Figure 14B:
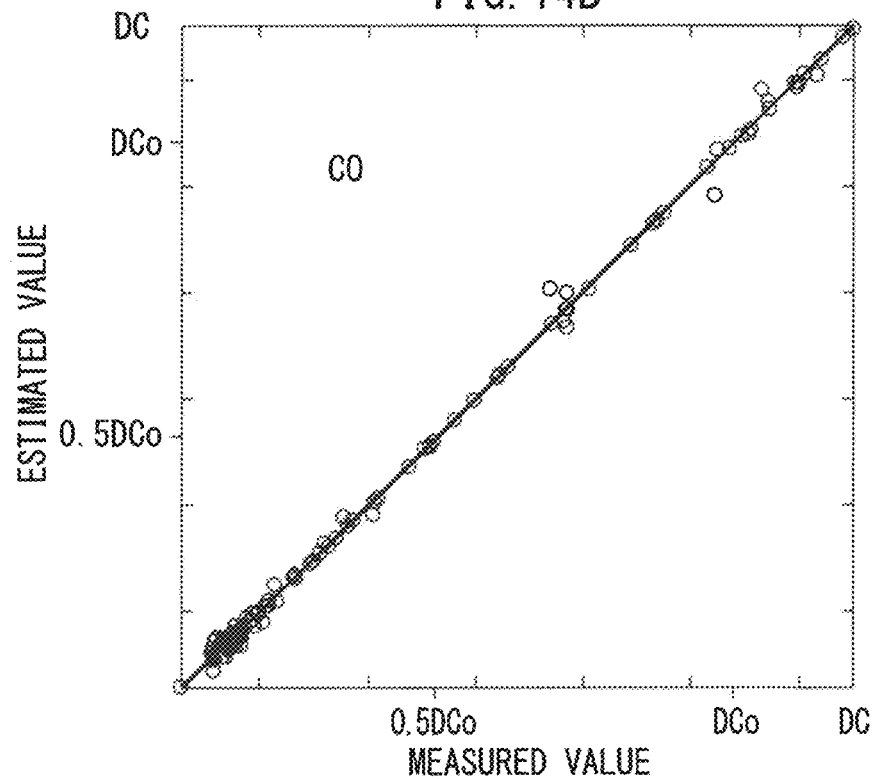

FIG. 14A shows the relationship between a measured value DM) and an estimated value DM) when using the machine learning device 71 shown in FIG. 12 to estimate an HC concentration (ppm) DH in the exhaust gas flowing into the exhaust purification catalyst 16, while FIG. 14B shows the relationship between a measured value $DC_0$ and an estimated value $DC_0$ when using the machine learning device 71 shown in FIG. 12 to estimate a CO concentration (ppm) DC in the exhaust gas flowing into the exhaust purification catalyst 16. If comparing FIG. 14A and FIG. 14B, compared with the case shown in FIG. 14A, the precision of estimation is higher in the case shown in FIG. 14B. Therefore, when using the machine learning device 70 shown in FIG. 12 to predict the catalyst temperature, it will be understood that rather than the estimated value of the HC concentration in the exhaust gas, it is preferable to use the estimated value of the CO concentration in the exhaust gas.

Note that, as explained above, the HC or CO concentration in the exhaust gas flowing into the exhaust purification catalyst 16 is acquired from the output signal of the HC concentration sensor 26 or CO concentration sensor 26 or is detected using a gas analyzer analyzing the components of the sampled exhaust gas. Therefore, when using the machine learning device 70 shown in FIG. 12 to predict the catalyst temperature, it can be said to be preferable to use the CO concentration sensor 26 to detect the CO concentration in the exhaust gas or use a gas analyzer to detect the CO concentration in the exhaust gas. Note that, in the second embodiment according to the present invention, when the machine learning device 71 finishes machine learning of the CO concentration in the exhaust gas, the CO concentration sensor 26 or gas analyzer become unnecessary. Therefore, the second embodiment according to the present invention can be said to be suited for the case of predicting the catalyst temperature on-board.

Note that, as the learning use data set and the test data for validation of the precision, suitable combinations of data can be selected from all data. Further, in the present embodiment, the holdout validation method is used, but the cross validation method may also be used to validate the machine learning.

Now then, in the embodiment according to the present invention, as shown in FIG. 9, a learned model for estimating the temperature of the exhaust purification catalyst is prepared by using a neural network from the engine speed, the engine load rate, the air-fuel ratio of the engine, the ignition timing of the engine, and the HC or CO concentration of the exhaust gas flowing into the exhaust purification catalyst. In the embodiment according to the present invention, this learned model is built into the electronic control unit 30.

In this case, in the embodiment according to the present invention, this electronic control unit is comprised of an electronic control unit which has built into it a learned model. This learned model is generated by acquiring a learning use data set prepared based on values of the pressure sensor 23, temperature sensor 24, air-fuel ratio sensor 25, HC concentration or CO concentration sensor 26 or gas analyzer, temperature sensor 27 and the values calculated in a CPU 34 of the electronic control unit 30, which learning use data set showing the relationships among the engine speed, the engine load rate, the air-fuel ratio of the engine, the ignition timing of the engine, the HC or CO concentration of the exhaust gas flowing into the exhaust purification catalyst and the temperature of the exhaust purification catalyst, and by learning the weight of the neural network. In this case, the weight of the neural network is learned by using the acquired engine speed, the engine load rate, air-fuel ratio of the engine, ignition timing of the engine, and HC or CO concentration of the exhaust gas flowing into the exhaust purification catalyst as input parameters of a neural network and by using the acquired temperature of the exhaust purification catalyst as training data.

Further, in this case, in the embodiment of the present invention, as mentioned above, the learned model is comprised of a learned model which is generated by acquiring a learning use data set prepared based on values of the pressure sensor 23, temperature sensor 24, air-fuel ratio sensor 25, HC concentration or CO concentration sensor 26 or gas analyzer, temperature sensor 27 and the values calculated in a CPU 34 of the electronic control unit 30, which learning use data set showing the relationships among the engine speed, the engine load rate, the air-fuel ratio of the engine, the ignition timing of the engine, the HC or CO concentration of the exhaust gas flowing into the exhaust purification catalyst and the temperature of the exhaust purification catalyst, and by learning the weight of the neural network. In this case, the weight of the neural network is learned by using the acquired engine speed, the engine load rate, air-fuel ratio of the engine, ignition timing of the engine, and HC or CO concentration of the exhaust gas flowing into the exhaust purification catalyst as input parameters of a neural network and by using the acquired temperature of the exhaust purification catalyst as training data.

On the other hand, when producing an electronic control unit, it is possible to incorporate a learned neural network inside the electronic control unit as a learned model. Therefore, in the embodiment of the present invention, as a method of production of an electronic control unit, use may be made of a method of production of an electronic control unit by incorporating a learned neural network inside the electronic control unit as a learned model. In this case, this learned model is generated by acquiring a learning use data set prepared based on values of the pressure sensor 23, temperature sensor 24, air-fuel ratio sensor 25, HC concentration or CO concentration sensor 26 or gas analyzer, temperature sensor 27 and the values calculated in a CPU 34 of the electronic control unit 30, which learning use data set showing the relationships among the engine speed, the engine load rate, the air-fuel ratio of the engine, the ignition timing of the engine, the HC or CO concentration of the exhaust gas flowing into the exhaust purification catalyst and the temperature of the exhaust purification catalyst, and by learning the weight of the neural network. In this case, the weight of the neural network is learned by using the acquired engine speed, the engine load rate, air-fuel ratio of the engine, ignition timing of the engine, and HC or CO concentration of the exhaust gas flowing into the exhaust purification catalyst as input parameters of a neural network and by using the acquired temperature of the exhaust purification catalyst as training data.

Figure 15:
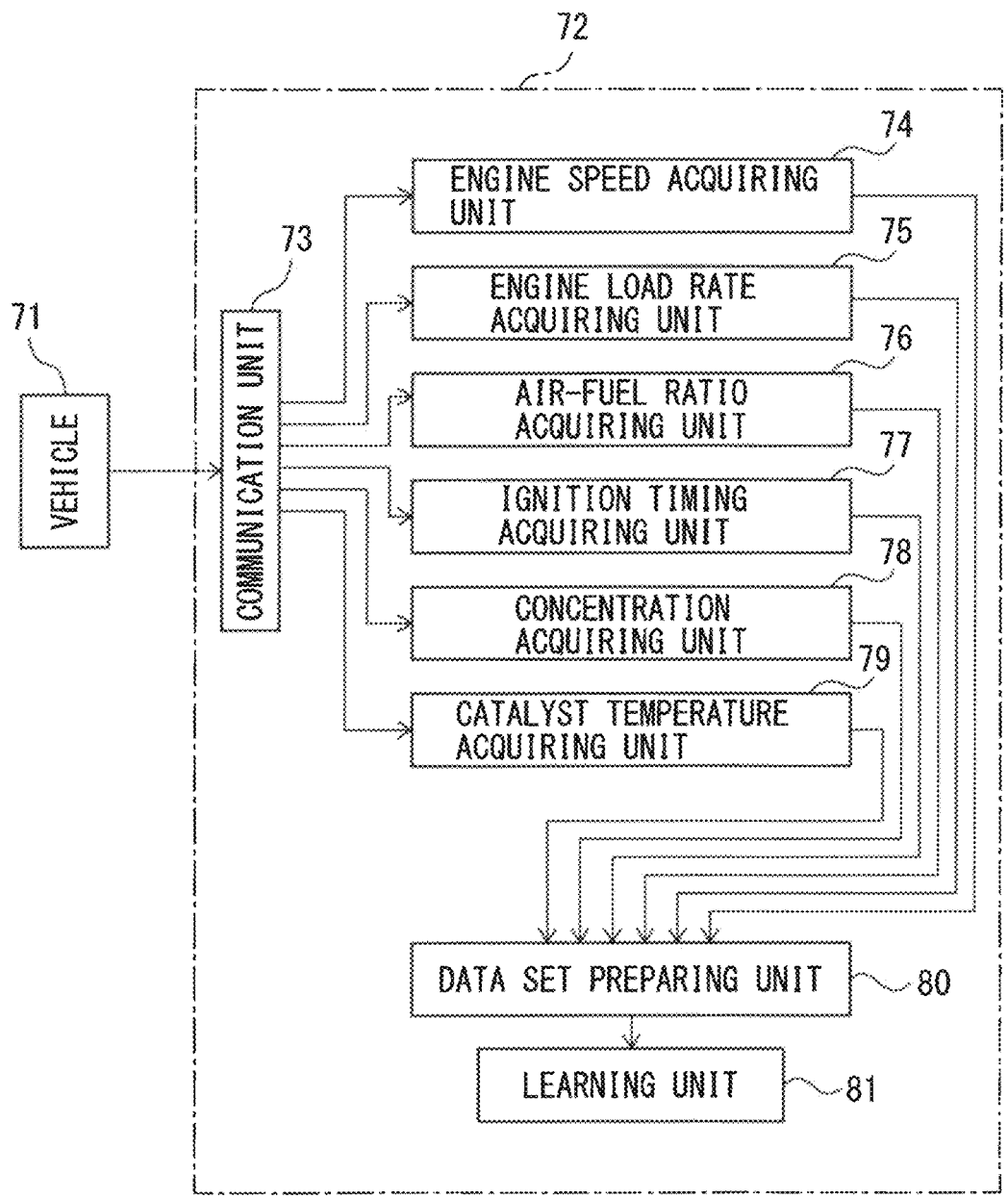
FIG. 15 is a functional block diagram showing still another embodiment according to the present invention.

On the other hand, FIG. 15 is an overall view showing one example of a machine learning system for predicting a temperature of an exhaust purification catalyst of an internal combustion engine. Referring to FIG. 15, 71 indicates a vehicle, while 72 indicates a server 72 set outside the vehicle 71. In this vehicle 71, based on values of the pressure sensor 23, temperature sensor 24, air-fuel ratio sensor 25, HC concentration or CO concentration sensor 26 or gas analyzer, temperature sensor 27 and the values calculated in a CPU 34 inside the electronic control unit 30, the engine speed, the engine load rate, the air-fuel ratio of the engine, the ignition timing of the engine, the HC or CO concentration of the exhaust gas flowing into the exhaust purification catalyst, and the temperature of the exhaust purification catalyst are found.

On the other hand, the server 72, as shown in FIG. 15, comprises a communicating unit 73 communicating with the vehicle 71, an engine speed acquiring unit 4 for acquiring an engine speed from the vehicle 71 through the communicating unit 73, an engine load rate acquiring unit 75 for acquiring the engine load rate from the vehicle 71 through the communicating unit 73, an air-fuel ratio acquiring unit 76 for acquiring the air-fuel ratio of the engine from the vehicle 71 through the communicating unit 73, an ignition timing acquiring unit 77 for acquiring the ignition timing of the engine from the vehicle 71 through the communicating unit 73, a concentration acquiring unit 78 for acquiring the HC or CO concentration of the exhaust gas flowing into an exhaust purification catalyst from the vehicle 71 through the communicating unit 73, an exhaust purification catalyst temperature acquiring unit 79 for acquiring the temperature of the exhaust purification catalyst from the vehicle 71 through the communicating unit 73, a data set preparing unit 80 using the acquired engine speed, engine load rate, air-fuel ratio of the engine, ignition timing of the engine, HC or CO concentration, and exhaust purification catalyst temperature to prepare a data set, and a learning unit 81 for learning the temperature of the exhaust purification catalyst according to this data set.

That is, this machine learning system for predicting a temperature of an exhaust purification catalyst of an internal combustion engine comprises an engine speed acquiring unit 74 for acquiring an engine speed, an engine load factor acquiring unit 75 for acquiring a load factor of the engine, an air-fuel ratio acquiring unit 76 for acquiring an air-fuel ratio of the engine, an ignition timing acquiring unit 77 for acquiring an ignition timing of the engine, a concentration acquiring unit 78 for acquiring an HC or CO concentration of the exhaust gas flowing into the exhaust purification catalyst, an exhaust purification catalyst temperature acquiring unit 79 for acquiring a temperature of the exhaust purification catalyst, a data set preparing unit 80 for preparing a data set using the acquired engine speed, engine load rate, air-fuel ratio of the engine, ignition timing of the engine, HC or CO concentration, and exhaust purification catalyst temperature, and a learning unit 81 for learning a temperature of the exhaust purification catalyst based on this data set.

In this machine learning system, data relating to the engine speed, engine load rate, air-fuel ratio of the engine, ignition timing of the engine, HC or CO concentration of the exhaust gas flowing into the exhaust purification catalyst, and temperature of the exhaust purification catalyst acquired in the vehicle 71 is received from the communicating unit 73 of the server 72. The received engine speed, the engine load rate, air-fuel ratio of the engine, ignition timing of the engine, HC or CO concentration of the exhaust gas flowing into the exhaust purification catalyst, and temperature of the exhaust purification catalyst are used to prepare a data set. The temperature of the exhaust purification catalyst is learned in accordance with this data set.

Figure 16:
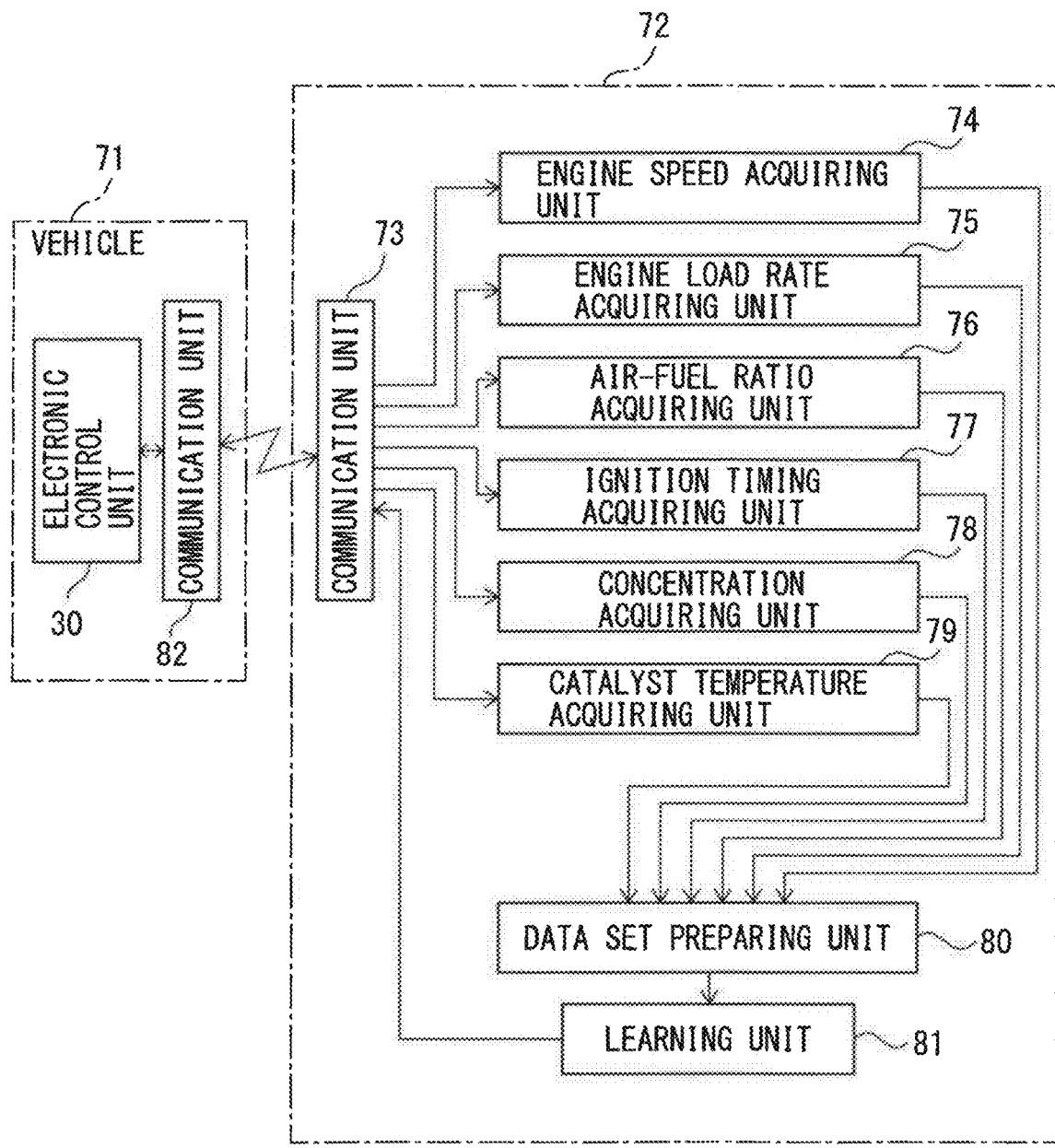
FIG. 16 is a functional block diagram showing still another embodiment according to the present invention.

On the other hand, FIG. 16 shows an overall view of another example of a machine learning system for predicting the temperature of the exhaust purification catalyst of an internal combustion engine. In this example as well, in the same way as FIG. 15, 71 shows a vehicle, while 72 shows a server set outside of the vehicle 71. This server 72 also, in the same way as the server 72 shown in FIG. 15, comprises a communicating unit 73 for communicating with the vehicle 71, an engine speed acquiring unit 74 for acquiring an engine speed, an engine load rate acquiring unit 75 for acquiring an engine load rate, an air-fuel ratio acquiring unit 76 for acquiring an air-fuel ratio of the engine, an ignition timing acquiring unit 77 for acquiring an ignition timing of the engine, a concentration acquiring unit 78 for acquiring an HC or CO concentration of the exhaust gas flowing into the exhaust purification catalyst, an exhaust purification catalyst temperature acquiring unit 79 for acquiring a temperature of the exhaust purification catalyst, a data set preparing unit 80 for preparing a data set using the acquired engine speed, engine load rate, air-fuel ratio of the engine, ignition timing of the engine, HC or CO concentration, and exhaust purification catalyst temperature, and a learning unit 81 for learning the temperature of the exhaust purification catalyst in accordance with this data set.

On the other hand, in this example, the vehicle 71 is provided with a communicating unit 82 for communicating with the server 72 in addition to the vehicle-mounted electronic control unit 30. In this example as well, data relating to the engine speed, engine load rate, air-fuel ratio of the engine, ignition timing of the engine, HC or CO concentration of the exhaust gas flowing into the exhaust purification catalyst, and temperature of the exhaust purification catalyst acquired in the vehicle 71 is transmitted from the communicating unit 82 of the vehicle 71 to the communicating unit 73 of the server 72, a data set is prepared using the engine speed, engine load rate, air-fuel ratio of the engine, ignition timing of the engine, HC or CO concentration of the exhaust gas flowing into the exhaust purification catalyst, and temperature of the exhaust purification catalyst received at the communicating unit 73, and the temperature of the exhaust purification catalyst is learned in accordance with this data set. Next, the learned model of the temperature of the exhaust purification catalyst is transmitted from the communicating unit 73 of the server 72 to the communicating unit 82 of the vehicle 71. The weight of the neural network in the vehicle-mounted electronic control unit 30 is updated by the learned model received at the communicating unit 82.

That is, in this example, data showing the engine speed, the engine load rate, the air-fuel ratio of the engine, the ignition timing of the engine, the HC or CO concentration of exhaust gas flowing into the exhaust purification catalyst, and the temperature of the exhaust purification catalyst is acquired in the vehicle, this data is transmitted to the server, a learned model is generated in the server by using the received engine speed, engine load rate, air-fuel ratio of the engine, ignition timing of the engine, and HC or CO concentration of the exhaust gas flowing into the exhaust purification catalyst as input parameters of a neural network and by using the received temperature of the exhaust purification catalyst as training data to learn a weight of the neural network, the generated learned model is transmitted to the vehicle, and the temperature of the exhaust purification catalyst of the internal combustion engine is predicted by using the learned model from the acquired engine speed, engine load rate, air-fuel ratio of the engine, ignition timing of the engine, and HC or CO concentration of the exhaust gas flowing into the exhaust purification catalyst. In this case, the server comprises the communicating unit 73 for communicating with the vehicle 71, the engine speed acquiring unit 74 for acquiring the engine speed, the engine load rate acquiring unit 75 for acquiring the engine load rate, the air-fuel ratio acquiring unit 76 for acquiring the air-fuel ratio of the engine, the ignition timing acquiring unit 77 for acquiring the ignition timing of the engine, the concentration acquiring unit 78 for acquiring the HC or CO concentration of the exhaust gas flowing into the exhaust purification catalyst, the exhaust purification catalyst temperature acquiring unit 79 for acquiring the temperature of the exhaust purification catalyst, the data set preparing unit 80 for preparing a data set using the acquired engine speed, engine load rate, air-fuel ratio of the engine, ignition timing of the engine, HC or CO concentration, and exhaust purification catalyst temperature, and the learning unit 81 for learning the temperature of the exhaust purification catalyst in accordance with the data set.

The present machine learning handles output forming a continuous value as a problem of regression, but the output may also be considered as a problem of classification of a finite number of discrete categories (multiclass classification). Specifically, it is sufficient to prepare several classes as output and link the classes and the temperatures of the catalyst.

Further, in machine learning, there are various methods for supervised learning besides a neural network such as the Random forest, support vector machine, and k neighbor algorithm. These models are common on the point of being algorithms which lay boundary lines in feature spaces laid by feature vectors and efficiently find the decision boundaries. That is, if possible to be estimated by a neural network, machine learning is possible by other supervised learning models as well.

Further, as machine learning, instead of using supervised learning, it is also possible to use semi supervised learning.

The invention claimed is:
1. A machine learning system for use with a vehicle, the machine learning system comprising:
a vehicle-mounted electronic control unit configured to:
acquire data showing an engine speed, an engine load rate, an air-fuel ratio of an engine, an ignition timing of the engine, an HC or CO concentration of exhaust gas flowing into an exhaust purification catalyst and a temperature of the exhaust purification catalyst from the vehicle; and
a server configured to:
acquire the data from the vehicle-mounted electronic control unit, including acquiring: (i) the engine speed, (ii) the engine load rate, (iii) the air-fuel ratio of the engine, (iv) the ignition timing of the engine, (v) the HC or CO concentration of exhaust gas flowing into the exhaust purification catalyst, and (vi) the temperature of the exhaust purification catalyst,
prepare a data set using the acquired engine speed, engine load rate, air-fuel ratio of the engine, ignition timing of the engine, HC or CO concentration, and exhaust purification catalyst temperature,
determine the temperature of the exhaust purification catalyst in accordance with the prepared data set,
generate a learned model based on the acquired engine speed, engine load rate, air-fuel ratio of the engine, ignition timing of the engine, and HC or CO concentration of the exhaust gas flowing into the exhaust purification catalyst as input parameters of a neural network,
learn a weight of the neural network by applying a received temperature of the exhaust purification catalyst as training data, and
transmit the generated learned model to the vehicle, wherein:
the temperature of the exhaust purification catalyst of the internal combustion engine is predicted based on the learned model from the acquired engine speed, the engine load rate, air-fuel ratio of the engine, ignition timing of the engine, and HC or CO concentration of the exhaust gas flowing into the exhaust purification catalyst in the vehicle.

* * * * *